(12) United States Patent
Arngren et al.

(10) Patent No.: US 12,363,606 B2
(45) Date of Patent: Jul. 15, 2025

(54) COMMUNICATION WITH A NETWORK VIA MOBILE NODES

(71) Applicant: Telefonaktiebolaget LM Ericsson (publ), Stockholm (SE)

(72) Inventors: Tommy Arngren, Södra Sunderbyn (SE); Min Wang, Luleå (SE); Jan Christoffersson, Luleå (SE); Mårten Ericson, Gammelstad (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 512 days.

(21) Appl. No.: 17/640,433

(22) PCT Filed: Sep. 6, 2019

(86) PCT No.: PCT/EP2019/073862
§ 371 (c)(1),
(2) Date: Mar. 4, 2022

(87) PCT Pub. No.: WO2021/043421
PCT Pub. Date: Mar. 11, 2021

(65) Prior Publication Data
US 2022/0345977 A1  Oct. 27, 2022

(51) Int. Cl.
*H04W 40/12* (2009.01)
(52) U.S. Cl.
CPC .................. *H04W 40/12* (2013.01)
(58) Field of Classification Search
CPC ... H04W 68/025; H04W 92/20; H04W 68/04; H04W 76/28; H04W 76/27; H04W 76/19;
(Continued)

(56) References Cited

U.S. PATENT DOCUMENTS 10,708,833 B2 * 7/2020 Jha .................... H04W 36/08
2005/0185632 A1 8/2005 Draves, Jr. et al.
(Continued)

FOREIGN PATENT DOCUMENTS

EP           17730003 A1    11/2007
WO   WO-2013168187 A3 *  1/2014   ........... G06Q 10/087

OTHER PUBLICATIONS

International Search Report and Written Opinion dated Jul. 3, 2020 for International Application No. PCT/EP2019/073862 filed Sep. 6, 2019, consisting of 28-pages.
(Continued)

*Primary Examiner* — David Q Nguyen
(74) *Attorney, Agent, or Firm* — Weisberg I.P. Law, P.A.

(57) ABSTRACT

A method performed in a User Equipment (UE) is disclosed, the UE being operable to connect to a communication network. The method includes transmitting a path request message requesting a path for transmission of data to the communication network, the path request message including an identifier of the UE, and receiving at least one path message including an ordered list of identifiers of mobile nodes and of a base station node of the communication network that form a path for transmission of data from the UE to the communication network. The method further includes selecting a path from the received at least one path message and transmitting data to the first mobile node in the selected path. Also disclosed are a method performed by a mobile node such as an Unmanned Aerial Vehicle (UAV), a UE, a mobile node and computer program product.

37 Claims, 17 Drawing Sheets

(58) Field of Classification Search
CPC ..... H04W 40/12; H04W 84/18; H04W 24/04; H04W 40/34; H04L 47/827; H04L 47/28; H04L 47/24; H04L 7/0008; H04L 12/4035; H04L 2012/4026; G05B 19/4185
USPC ................................ 370/328, 329, 330, 316
See application file for complete search history.

(56) References Cited

U.S. PATENT DOCUMENTS

| | | | |
|---|---|---|---|
| 2005/0195814 A1 | 9/2005 | Hagiwara et al. | |
| 2007/0097945 A1* | 5/2007 | Wang ................ | H04W 40/246 370/349 |
| 2016/0242099 A1* | 8/2016 | Floberg ................ | H04W 40/08 |
| 2018/0007518 A1 | 1/2018 | O'Berry et al. | |
| 2020/0053724 A1* | 2/2020 | MolavianJazi ....... | H04W 72/56 |
| 2020/0053771 A1* | 2/2020 | Jeong ................ | H04W 72/542 |
| 2022/0264532 A1* | 8/2022 | Bienas ................ | H04W 64/006 |

OTHER PUBLICATIONS

Johnson, et al. "The Dynamic Source Routing Protocol (DSR) for Mobile Ad Hoc Networks for IPv4"; Network Working Group; Rice University; Feb. 2007, consisting of 107 pages.

Bahloul, et al. "A Flocking-Based on Demand Routing Protocol for Unmanned Aerial Vehicles"; Journal of Computer Science and Technology; 33 (2); 262-276; Mar. 2018, consisting of 14-pages.

Nayyar, Anand "Flying Adhoc Network (FANETs): Simulation Based Performance Comparison of Routing Protocols: AODV, DSDV, DSR, OLSR, AOMDV and HWMP"; Graduate School, Duy Tan University, Da Nang, Vietnam, 2018, consisting of 9 pages.

AT&T Foundry; "The Future of Drones According to the AT&T Foundry" 2016, consisting of 52 pages.

Guevara et al. "UAV-Based GSM Network for Public Safety Communications" Department of Electrical & Computer Engineering, Florida International University, Apr. 9-12, 2015, consisting of 2 pages.

European Search Report dated Jun. 12, 2023 for Application No. 19766001.2, consisting of 5 pages.

* cited by examiner

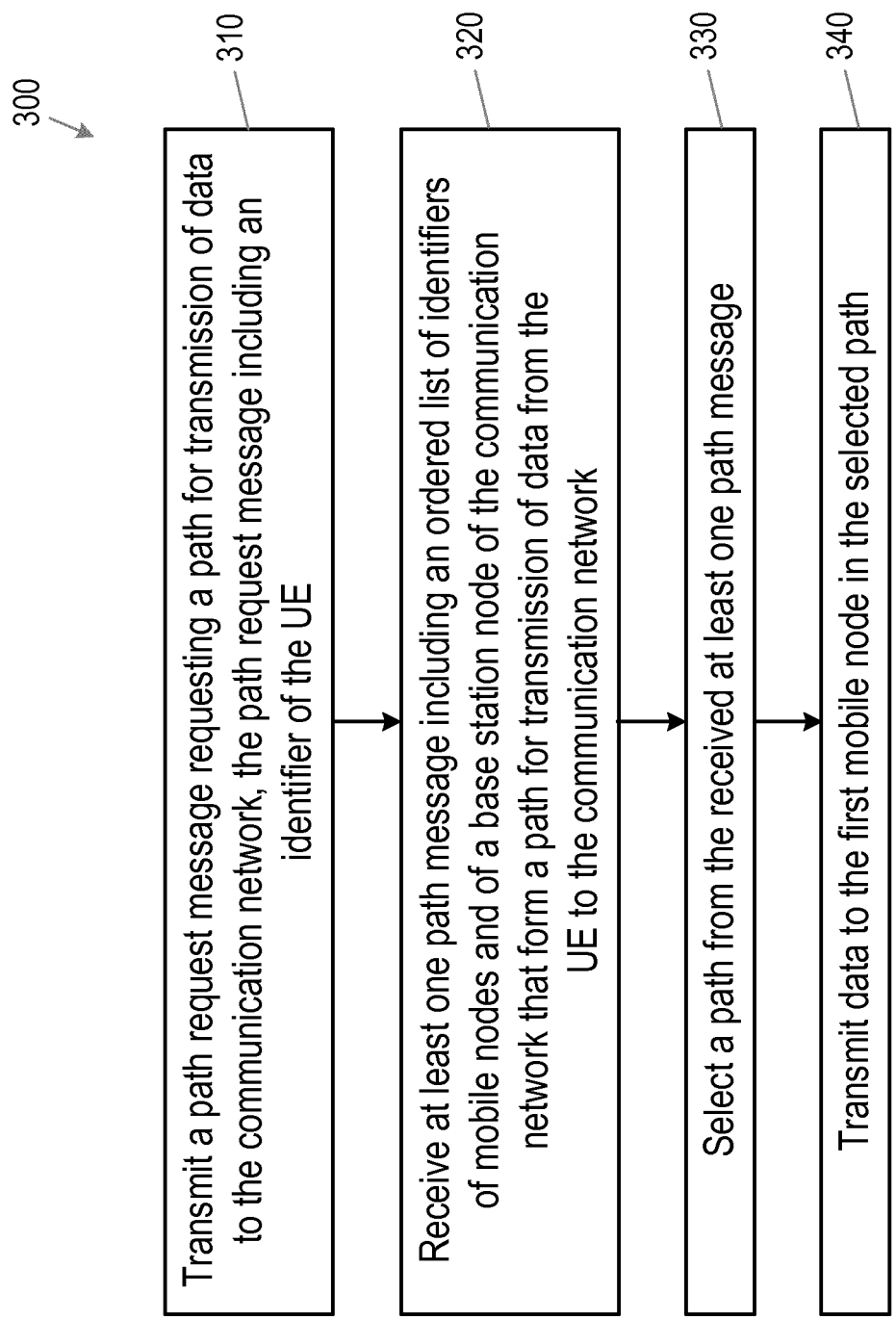

COMMUNICATION WITH A NETWORK VIA MOBILE NODES

CROSS-REFERENCE TO RELATED APPLICATION

This application is a Submission Under 35 U.S.C. § 371 for U.S. National Stage Patent Application of International Application Number: PCT/EP2019/073862, filed Sep. 6, 20219 entitled "COMMUNICATION WITH A NETWORK VIA MOBILE NODES," the entirety of which is incorporated herein by reference.

TECHNICAL FIELD

The present disclosure relates to methods performed in a User Equipment (UE) and a mobile node that are operable to connect to a communication network. The present disclosure also relates to a UE, a mobile node and to a computer program and a computer program product configured, when run on a computer to carry out methods in a UE and a mobile node.

BACKGROUND

Unmanned Aerial Vehicles (UAVs), also referred to as drones, are increasingly used in a wide variety of industrial and commercial fields. Examples include delivery services, aerial photography and film making, remote sensing tasks for agriculture, city planning, civil engineering, support for public safety and rescue services, communication, etc. The UAV market is rapidly expanding, with new use cases and applications being explored. In addition, UAVs are becoming cheaper, and advances in the fields of robotics, artificial intelligence, and mobile connectivity are fuelling growth in the UAV industry.

There are many different types of UAVs that can be remote controlled using Wi-Fi or proprietary radio. UAVs are capable of communication, sensing and autonomous operation, and are also able to analyse data collected via sensors, camera etc. UAVs can be used as relays between ground-based terminals and a network base station to extend the reach of a communication network. It is also envisaged that UAVs may serve as flying radio base stations to provide cellular network coverage to users within reach, as proposed in K Guevara et al. "UAV-based GSM network for public safety communications", Proceedings of the IEEE SoutheastCon 2015, April 9-12, 2015—Fort Lauderdale, Florida.

The possibility of using UAVs to extend cellular network coverage raises the question of how to route user data via mobile UAVs. One option for routing of data traffic between UAVs acting as an ad-hoc network is to let UAVs be IP routers, with each UAV node maintaining an IP routing table, and application data capsulated and transmitted via TCP/IP. At every UAV node between the source and destination nodes, the UAV searches its routing table for a suitable next hop for the given destination address, and forwards a received packet to the selected next hop. This is repeated until the packet reaches its final destination.

The IP forwarding algorithm is a specific implementation of routing for IP networks. In order to achieve a successful transfer of data, the algorithm uses a routing table to select a next-hop router as the next destination for a datagram. The IP address that is selected is known as the next-hop address. Each IP terminal may maintain an IP routing table in its memory, and routing is performed hop by hop, meaning that there is no complete path to the destination. The IP packet is forwarded from one hop to next hop, assuming that the next hop is closer to the destination.

Another routing mechanism that may be considered in the context of routing traffic between UAVs is Integrated Access and Backhaul (IAB), which is a study item for 3GPP Release 16. In a New Radio (NR) Radio Access Network (RAN), IAB capabilities enable an access point to establish a radio connection to another access point in order to reach a donor access point which has wireline backhaul. Access points with IAB capability are referred to as IAB nodes (IAB-N), and the radio connection between IAB nodes is referred to as wireless backhaul, or self-backhaul. FIG. 1 illustrates an example IAB network within a NR RAN. Referring to FIG. 1, a donor IAB-N (IAB-N x) has a cable backhaul to a gateway. Another node IAB-N y acts as a bridge node between the donor node IAB-N x and an access node IAB-N z, which requires backhaul connection. IAB-N y is referred to as the parent node of IAB N z and IAB-N z is referred to as the child node of IAB-N y. In another branch of the IAB network, access IAB-N k is connected to IAB-N j, and IAB-N j is connected to the donor node IAB-N x. Each IAB node may also have UEs connected to it.

For an IAB node, there can be three types of link:
Upstream hop comprising backhaul links to/from a parent IAB-N;
Downstream hop comprising backhaul links to/from a child IAB-N;
A number of downlink/uplink access links to served UEs;
The first two types of links are also referred to as backhaul links.

An IAB-N may be scheduled by its parent IAB-N and may also schedule its connected UEs and/or its own child IAB-Ns.

Path ID based packet forwarding/routing has been considered as a candidate routing mechanism for IAB networks. According to this routing mechanism, Path ID is employed for forwarding packets in the IAB network, where all the paths are computed by a centralised entity (Donor IAN node) and are provided and stored in each IAB node. The end nodes, i.e. the Donor IAB node and the Access IAB node, add a Path ID in the packet header (Adaptation layer header) of a packet for transmission. Intermediate IAB nodes obtain the next IAB node for the Path ID (carried in the packet header) by inspecting the paths stored in their IAB node database, and then forward the packet to the next IAB node for the Path ID. FIG. 2 shows an illustrative example for Path ID based packet forwarding in an IAB network. As the intermediate nodes forward packets based on the Path ID carried in the packet header (added either by the Donor IAB node in DL or the Access IAB node in UL), packets can easily be switched from one path to a different path (among the computed paths for a particular destination) by modifying the Path ID in the packet headers at the end nodes. This flexibility in path selection means Path ID based forwarding does not need to update the intermediate IAB nodes lookup/forwarding tables every time network load conditions change, leading to less signalling overhead.

IAB offers a possible solution for routing of data to an access point for communication network connectivity. However, the IAB solution introduces complexity in the maintaining of the path databases; whenever there is a change in the central database, this information must be distributed to all IAB nodes. In addition, each IAB node is assumed to remain stationary so that the Path table is semi-statically configured. In principle, this mechanism therefore lacks the mobility support that is required to enable routing of data over an ad-hoc network of UAVs.

SUMMARY

It is an aim of the present disclosure to provide a method, apparatus and computer readable medium which at least partially address one or more of the challenges discussed above.

According to a first aspect of the present disclosure, there is provided a method performed in a User Equipment (UE) that is operable to connect to a communication network. The method comprises transmitting a path request message requesting a path for transmission of data to the communication network, the path request message including an identifier of the UE. The method further comprises receiving at least one path message including an ordered list of identifiers of mobile nodes, and of a base station node of the communication network, that form a path for transmission of data from the UE to the communication network. The method further comprises selecting a path from the received at least one path message, and transmitting data to the first mobile node in the selected path.

According to examples of the present disclosure, the method may initially comprise determining that the UE is outside of a coverage area of the communication network and that the UE has data for transmission to the communication network.

According to examples of the present disclosure, the mobile nodes identified in the at least one path message may comprise Unmanned Aerial Vehicles (UAVs) that are operable for communication with each other and with base station nodes of the communication network.

According to examples of the present disclosure, transmitting a path request message requesting a path for transmission of data to the communication network may comprise broadcasting the path request message.

According to examples of the present disclosure, the method may further comprise receiving an acknowledgement of the broadcast or message.

According to examples of the present disclosure, the method may further comprise broadcasting a discovery message requesting identification of mobile nodes within a communication range of the UE and receiving at least one discovery response to the broadcast discovery message, the discovery response identifying a mobile node. According to such examples, transmitting a path request message requesting a path for transmission of data to the communication network may comprise transmitting the message to at least one mobile node identified in the received discovery response message.

According to examples of the present disclosure, transmitting data to the first mobile node in the selected path may comprise adding, to a packet header of a packet of the data for transmission, an ordered list of the identifiers of the mobile nodes and base station node of the communication network that form the selected path for data transmission to the communication network.

According to examples of the present disclosure, the method may further comprise determining, on the basis of data to be transmitted to the communication network, target values of at least one parameter associated with the requested path for transmission of data to the communication network, and including the determined target values in the path request message.

Parameters associated with the requested path may include maximum number of hops in the path, node availability time of mobile nodes in the path, link availability time of links between nodes in the path, latency, radio link quality (such as path gain, RSRP, SINR) etc. According to examples of the present disclosure, the UE may also include a hop count parameter in the path request message, with a value of the hop count parameter set to an initial value, for example 1.

According to examples of the present disclosure, the at least one path message may further include at least one of a value of a link quality parameter indicating a quality of at least one link between nodes in the path for transmission of data to the communication network, and/or a value of a node availability time parameter indicating a time during which a node will be available for participation in the path formed by the nodes identified in the path message.

According to examples of the present disclosure, selecting a path from the received at least one path message may comprise selecting a path on the basis of at least one of a number of nodes in the path, the identifier of the base station node in the path, quality of at least one link between nodes in the path, and/or availability time of at least one node in the path.

According to examples of the present disclosure, the method may further comprise receiving at least one updated path message, the updated path message including at least one of an updated value of a link quality parameter indicating a quality of at least one link between nodes in the path for transmission of data to the communication network or an updated identifier for a node in the path.

According to examples of the present disclosure, the method may further comprise checking whether a value of a link quality parameter indicating a quality of a link between any of the nodes in the selected path has fallen below a threshold value and, if a value of a link quality parameter indicating a quality of a link between any of the nodes in the selected path has fallen below a threshold value, initiating selection of an alternative path and transmitting data to the first mobile node in the selected alternative path.

According to examples of the present disclosure, initiating selection of an alternative path may comprise transmitting a new path request message to prompt receipt of new path messages, and selecting a new path from the newly received path messages, or may comprise selecting a new path on the basis of path messages that have already been received. According to examples of the present disclosure, during selection of an alternative path, the UE may continue transmitting data on the selected path or may pause data transmission until a new path is selected. The decision as to whether to pause or continue transmission during selection of an alternative path may be based on factors including link quality parameter values, nature or urgency of the data for transmission etc.

According to examples of the present disclosure, the method may further comprise, if a value of a link quality parameter indicating a quality of a link between any of the nodes in the selected path has not fallen below a threshold value, determining whether alternative paths have become available since selection of the currently selected path, selecting a path for transmission of data to the communication network from among currently available paths, and transmitting data to the first mobile node in the newly selected path.

According to examples of the present disclosure, the currently available paths may include the currently selected path, such that if none of the alternative paths that have become available since selection of the current path represent an improvement on the current path, the current path may be reselected.

According to examples of the present disclosure, the method may further comprise, if the at least one updated path message includes an updated identifier for a node in the path, checking whether the updated path message indicates an alternative path available for selection by the UE or a change to the selected path.

According to examples of the present disclosure, the checking step may comprise for example checking for a parameter or flag in the updated path message. According to examples of the present disclosure, if the updated path message indicates an alternative path available for selection by the UE, the UE may proceed to carry out the steps of preceding examples to select a path from currently available paths, or may store the updated path message for later consideration of alternative paths.

According to examples of the present disclosure, the method may further comprise, if the updated path message indicates a change to the selected path, determining whether a node in the selected path that has reported the change to the selected path has a path selection capability. The method may further comprise, if the node in the selected path that has reported the change to the selected path does have a path selection capability, continuing to transmit data on the changed selected path, and, if the node in the selected path that has reported the change to the selected path does not have a path selection capability, initiating selection of an alternative path.

According to examples of the present disclosure, initiating selection of an alternative path may comprise transmitting a new path request message to prompt receipt of new path messages, and selecting a new path from the newly received path messages, or may comprise selecting a new path on the basis of path messages that have already been received. The changed selected path may be among the paths from which the UE selects, but if the node reporting the change to the selected path does not have a path selection capability, the responsibility for selecting that path may be assumed by the UE, rather than trusting the node to have changed the selected path for the better.

According to examples of the present disclosure, the node that has reported the change to the selected path may comprise a node that is downstream of the changed node in the path, i.e. one hop closer to the UE. Checking a capability of this node may comprise checking a parameter or flag relating to this node and included in the updated path message.

According to examples of the present disclosure, consideration of alternative paths and selection of a new path may also be triggered by an update timer, in addition to being triggered by receipt of an updated path message. The update timer may initiate a periodic consideration of alternative paths, or may be linked to a reported availability time of one or more nodes in the path.

According to examples of the present disclosure, the method may further comprise, on transmitting the path request message requesting a path for transmission of data to the communication network, setting a UE path message timer, and, if the UE has not received at least one path message before expiry of the UE path message timer, performing at least one of aborting the method or transmitting a new path request message.

According to another aspect of the present disclosure, there is provided a method performed by a mobile node that is operable to connect to a communication network. The method comprises receiving a path request message requesting a path for transmission of data to the communication network, the path request message including an identifier of the transmitter of the path request message, and storing an identifier of the transmitter of the path request message. The method further comprises determining whether the mobile node is within a communication range of a base station node of the communication network, and, if the mobile node is not within a communication rage of a base station node of the communication network, forwarding the received path request message as a broadcast path request message, and including in the broadcast path request message an identifier of the mobile node.

According to examples of the present disclosure, the identifier of the mobile node may replace the identifier of the transmitter of the path request message in the forwarded broadcast path request message. In other examples, the identifier of the transmitter, and any list of preceding transmitters, may be maintained in the message, with the identifier of the mobile node added to the list. Maintaining such a list may for example assist with avoiding a situation in which a path request message is re-forwarded by a mobile node that has already received it.

According to examples of the present disclosure, the transmitter of the received path request message may be a UE or may be another mobile node. In some examples, the method may further comprise receiving and responding to a broadcast discovery message from a UE, before receiving the transmitted path request message.

According to examples of the present disclosure, the method may further comprise, if the mobile node is within a communication rage of a base station node of the communication network, adding an identifier of the base station node of the communication network with which the mobile node can communicate, and an identifier of the mobile node, to a path message as an ordered list of identifiers of mobile nodes and of a base station node of the communication network that form a path for transmission of data from the mobile node to the communication network. In such examples, the method may further comprise retrieving a stored identifier of a transmitter of a received path request message, and forwarding the path message to the retrieved identifier.

According to examples of the present disclosure, the mobile node may comprise an Unmanned Aerial Vehicle (UAV).

According to examples of the present disclosure, the path request message may further include a hop count parameter value, and the method may further comprise incrementing the value of the hop count parameter and replacing the hop count parameter value with the incremented hop count parameter value in the forwarded broadcast path request message.

According to examples of the present disclosure, the method may further comprise checking whether the incremented value of the hop count parameter exceeds a threshold and, if the incremented value of the hop count parameter exceeds the threshold, aborting the method, and, if the incremented value of the hop count parameter does not exceed the threshold, proceeding with the method.

According to examples of the present disclosure, the received path request message may be a broadcast message, and the method may further comprise sending an acknowledgement of path request message to the transmitter of the broadcast message, the acknowledgement of path request message including an identifier of the mobile node.

According to examples of the present disclosure, the method may further comprise, on receipt of the path request message, comparing the identifier of the transmitter of the path request message with an identifier of any previously received acknowledgement of broadcast path request messages, and, if the identifier of the transmitter of the path request message is the same as an identifier of any previously received acknowledgement of broadcast path request messages, discarding the received broadcast message. According to examples of the present disclosure, this may enable a mobile node that has forwarded a path request message to recognise that same path request message if it is in turn forwarded on as a broadcast message by the receiving mobile node.

According to examples of the present disclosure, the path request message may further comprise target values of at least one parameter associated with the requested path for transmission of data to the communication network. In such examples, the method may further comprise checking whether at least one of the mobile node or a link between the mobile node and at least the transmitter of the received path request message can meet the target values, and, if at least one of the mobile node or link cannot meet the target values, discarding the path request message, and, if the mobile node and link can meet the target values, proceeding with the method.

Examples of parameters associated with the requested path may include maximum number of hops in the path, node availability time of mobile nodes in the path, link availability time of links between nodes in the path, latency, radio link quality (such as path gain, RSRP, SINR) etc.

According to examples of the present disclosure, the method may further comprise receiving a path message including an ordered list of identifiers of mobile nodes and of a base station node of the communication network that form a path for transmission of data from the mobile node to the communication network and adding an identifier of the mobile node to the ordered list included in the received path message. The method may further comprise retrieving a stored identifier of a transmitter of a received path request message and forwarding the path message to the retrieved identifier.

According to examples of the present disclosure, in the event of more than one stored identifier, the mobile node may forward the path message to all of the stored identifiers. According to examples of the present disclosure, the identifier of the mobile node may be added to an end of the ordered list, with the identifier of the base station node being at an opposite end of the list.

According to examples of the present disclosure, the method may further comprise, on forwarding the path request message as a broadcast message, starting a mobile node path message timer, and maintaining a current position of the mobile node. According to such examples, the method may further comprise, if at least one path message has not been received before expiry of the mobile node path message timer, ceasing to maintain the current position of the mobile node.

According to examples of the present disclosure, the method may further comprise, if at least one path message has not been received before expiry of the mobile node path message timer, discarding the stored identity of the transmitter of the path request message.

According to examples of the present disclosure, the method may further comprise including in the forwarded path message at least one of a value of a link quality parameter indicating a quality of a link between the mobile node and at least one of the transmitter of the received path message or the transmitter of the received path request message and/or a value of a node availability time parameter indicating a time during which the mobile node will be available for participation in the path formed by the nodes identified in the forwarded path message.

According to examples of the present disclosure, in the case of a mobile node that is in communication with a base station of the communication network, the link quality parameter may indicate a quality of a link between the mobile node and the base station.

According to examples of the present disclosure, the method may further comprise receiving data for transmission, wherein the data includes an ordered list of identifiers of mobile nodes and a base station node of the communication network that form a path for data transmission to the communication network, and forwarding the data to the node in the ordered list whose identifier appears after the identifier of the mobile node.

According to examples of the present disclosure, in the ordered list, the identifier of the node from which the data for transmission was received may appear before the identifier of the mobile node. According to examples of the present disclosure, the method may further comprise maintaining a current position of the mobile node after forwarding the data.

According to examples of the present disclosure, the method may further comprise, on forwarding the path message to the retrieved identifier, starting a mobile node transmission timer and maintaining a current position of the mobile node, and, if data for transmission has not been received before expiry of the mobile node transmission timer, ceasing to maintain the current position of the mobile node.

According to examples of the present disclosure, the method may further comprise, if data for transmission has not been received before expiry of the mobile node transmission timer, discarding the stored identity of the transmitter of the path request message.

According to examples of the present disclosure, the method may further comprise, responsive to a path update trigger, checking for the presence of mobile nodes, in addition to a node to which the data was forwarded, within a communication range of the mobile node. The method may further comprise, if additional mobile nodes are not present, retrieving a stored identifier of a transmitter of a received path request message; sending an updated path message to the retrieved identifier, wherein the updated path message includes an updated value of at least one of a link quality parameter indicating a quality of a link between the mobile node and at least one of the transmitter of the received path message or the transmitter of the received path request message and/or a node availability time parameter indicating a time during which the mobile node will be available for participation in the path formed by the nodes identified in the forwarded path message.

According to examples of the present disclosure, the method may further comprise, if additional mobile nodes are present, re-forwarding the received path request message as a broadcast path request message, including in the broadcast path request message an identifier of the mobile node, receiving an updated path message including a new ordered list of identifiers of mobile nodes and of a base station node of the communication network that form a path for transmission of data from the mobile node to the communication network, and if the mobile node does not have a path selection capability, adding an identifier of the mobile node to the ordered list included in the received updated path message, retrieving a stored identifier of a transmitter of a received path request message, and forwarding the updated path message to the retrieved identifier.

According to examples of the present disclosure, the method may further comprise, if the mobile node has a path selection capability, setting a parameter in the updated path message to state that the updated path message indicates a change to a selected path, adding an identifier of the mobile node to the ordered list included in the received updated path message, retrieving a stored identifier of a transmitter of a received path request message, and forwarding the updated path message to the retrieved identifier.

According to examples of the present disclosure, the method may further comprise, setting a parameter in the updated path message to indicate that the mobile node has a path selection capability.

According to examples of the present disclosure, the path update trigger may comprise at least one of a time based trigger or a threshold based trigger indicating that a value of a link quality parameter indicating a quality of a link between the mobile node and another node in the path has fallen below a threshold value.

According to examples of the present disclosure, the other node in the path may be upstream or downstream of the mobile node, and so may be the node from which the mobile node received the path message or from which the mobile node received the path request message.

According to another aspect of the present disclosure, there is provided a computer program comprising instructions which, when executed on at least one processor, cause the at least one processor to carry out a method according to any one of the preceding aspects or examples of the present disclosure.

According to another aspect of the present disclosure, there is provided a carrier containing a computer program according to the preceding aspect of the present disclosure, wherein the carrier comprises one of an electronic signal, optical signal, radio signal or computer readable storage medium.

According to another aspect of the present disclosure, there is provided a computer program product comprising non transitory computer readable media having stored thereon a computer program according to a preceding aspect of the present disclosure.

According to another aspect of the present disclosure, there is provided a User Equipment (UE) that is operable to connect to a communication network. The UE comprises processing circuitry configured to cause the UE to transmit a path request message requesting a path for transmission of data to the communication network, the path request message including an identifier of the UE and to receive at least one path message including an ordered list of identifiers of mobile nodes and of a base station node of the communication network that form a path for transmission of data from the UE to the communication network. The processing circuitry is further configured to cause the UE to select a path from the received at least one path message, and transmit data to the first mobile node in the selected path.

According to examples of the present disclosure, the processing circuitry may be further configured to cause the UE to perform a method according to any one of the preceding aspects or examples of the present disclosure.

According to another aspect of the present disclosure, there is provided a mobile node that is operable to connect to a communication network. The mobile node comprises processing circuitry configured to cause the mobile node to receive a path request message requesting a path for transmission of data to the communication network, the path request message including an identifier of the transmitter of the path request message. The processing circuitry is further configured to cause the mobile node to store an identifier of the transmitter of the path request message and determine whether the mobile node is within a communication range of a base station node of the communication network. The processing circuitry is further configured to cause the mobile node, if the mobile node is not within a communication rage of a base station node of the communication network, to forward the received path request message as a broadcast path request message, and including in the broadcast path request message an identifier of the mobile node.

According to examples of the present disclosure, the processing circuitry may be further configured to cause the mobile node to perform a method according to any one of the preceding aspects or examples of the present disclosure.

BRIEF DESCRIPTION OF THE DRAWINGS

For a better understanding of the present disclosure, and to show more clearly how it may be carried into effect, reference will now be made, by way of example, to the following drawings in which:

FIG. 3 shows a flow chart illustrating process steps in a method performed in a UE;

DETAILED DESCRIPTION

Aspects of the present disclosure provide methods facilitating opportunistic routing of data from a UE to a communication network via one or more mobile nodes. The routing may enable data transmission in an area of no or very limited coverage from the communication network. Data transmission takes place over a path formed by nodes including mobile nodes and a base station of the communication network. The nodes forming the path may be selected from among any available mobile node and/or base station.

FIGS. 3 to 6 are flow charts illustrating process steps in methods that may be carried out by a User Equipment (UE) and mobile node that are operable to connect to a communication network. The individual steps of the methods in FIGS. 3 to 6 are discussed below. Example implementations of the methods are then discussed with reference to FIGS. 7 and 8.

FIG. 3 illustrates process steps in a method 300 performed in a UE that is operable to connect to a communication network. Referring to FIG. 3, the method comprises, in a first step 310, transmitting a path request message requesting a path for transmission of data to the communication network, the path request message including an identifier of the UE. In step 320, the method comprises receiving at least one path message including an ordered list of identifiers of mobile nodes, and of a base station node of the communication network, that form a path for transmission of data from the UE to the communication network. The method further comprises, in step 330, selecting a path from the received at least one path message and, in step 340, transmitting data to the first mobile node in the selected path. In some examples of the method 300, the method may further comprise initially determining that the UE is outside of a coverage area of the communication network, and that the UE has data for transmission to the communication network.

Figure 1:
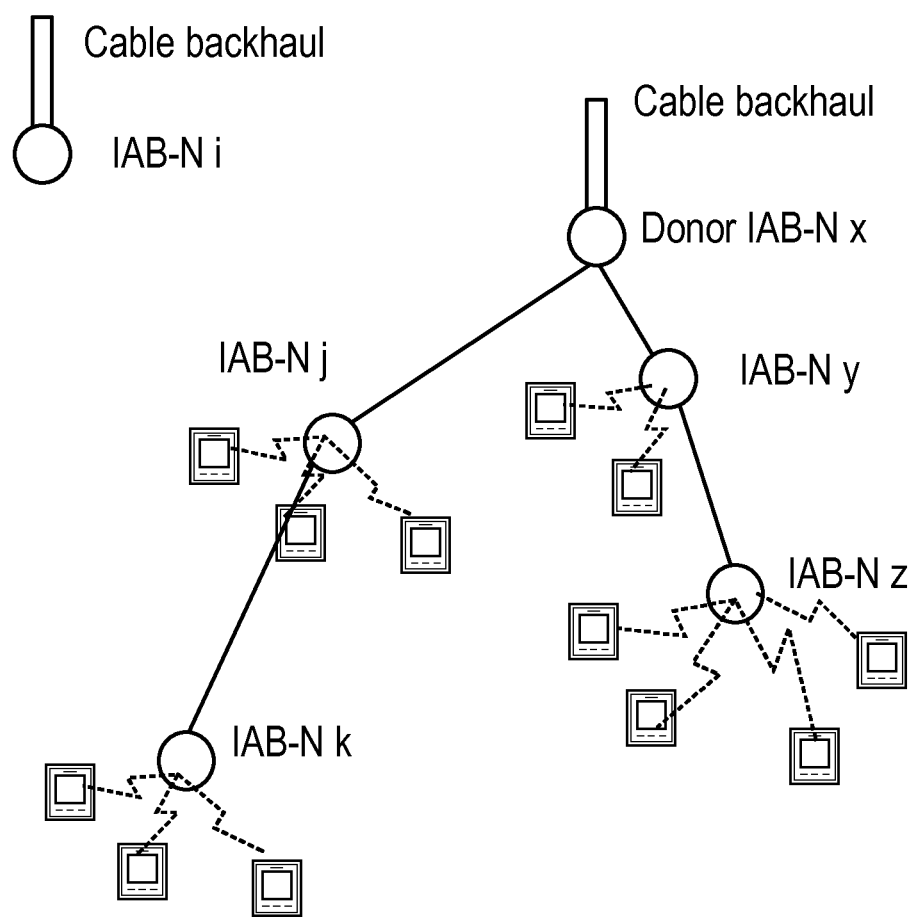
FIG. 1 illustrates an example IAB network within a NR RAN.
Figure 2:
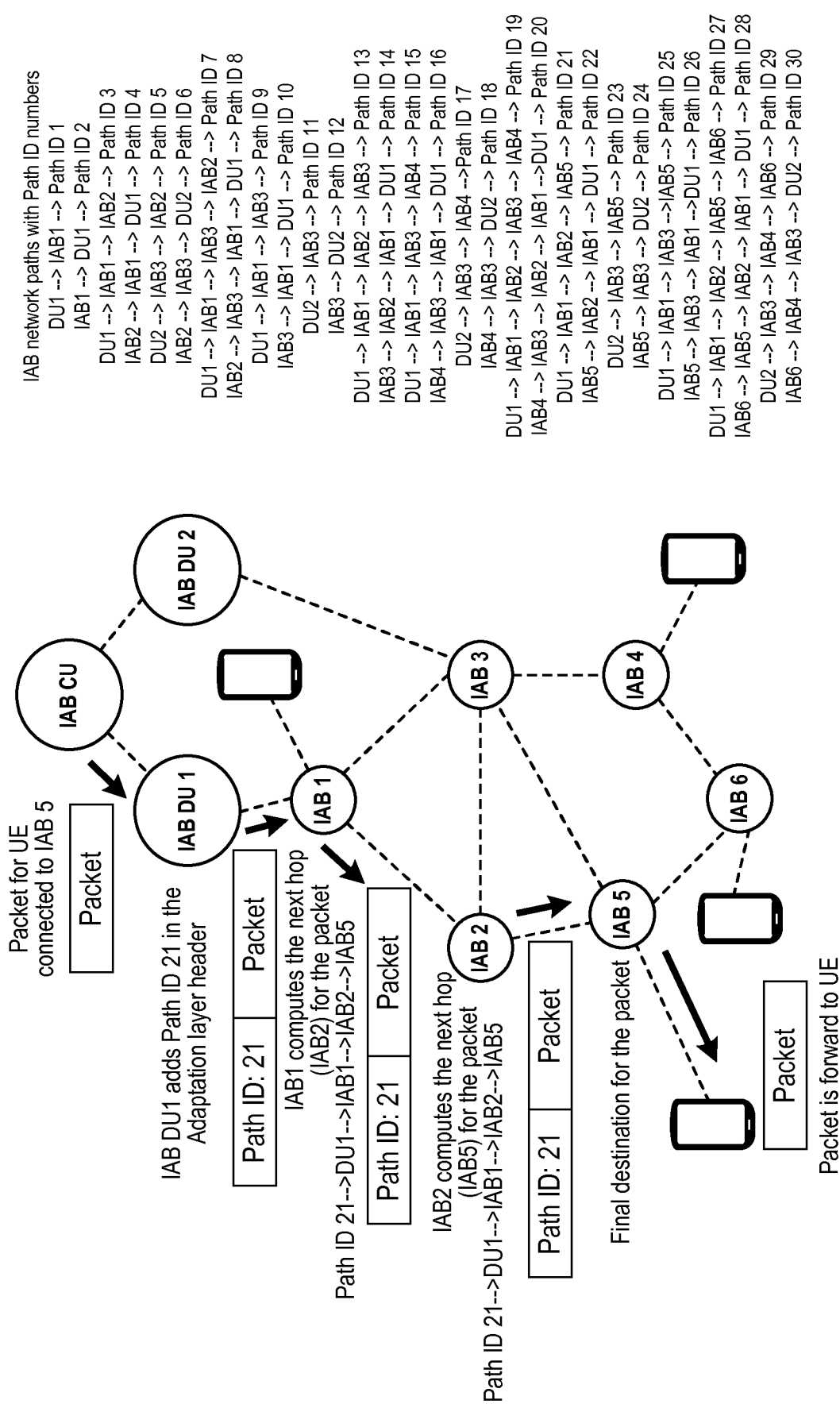
FIG. 2 shows an illustrative example for Path ID based packet forwarding in an IAB network.
Figure 4A:
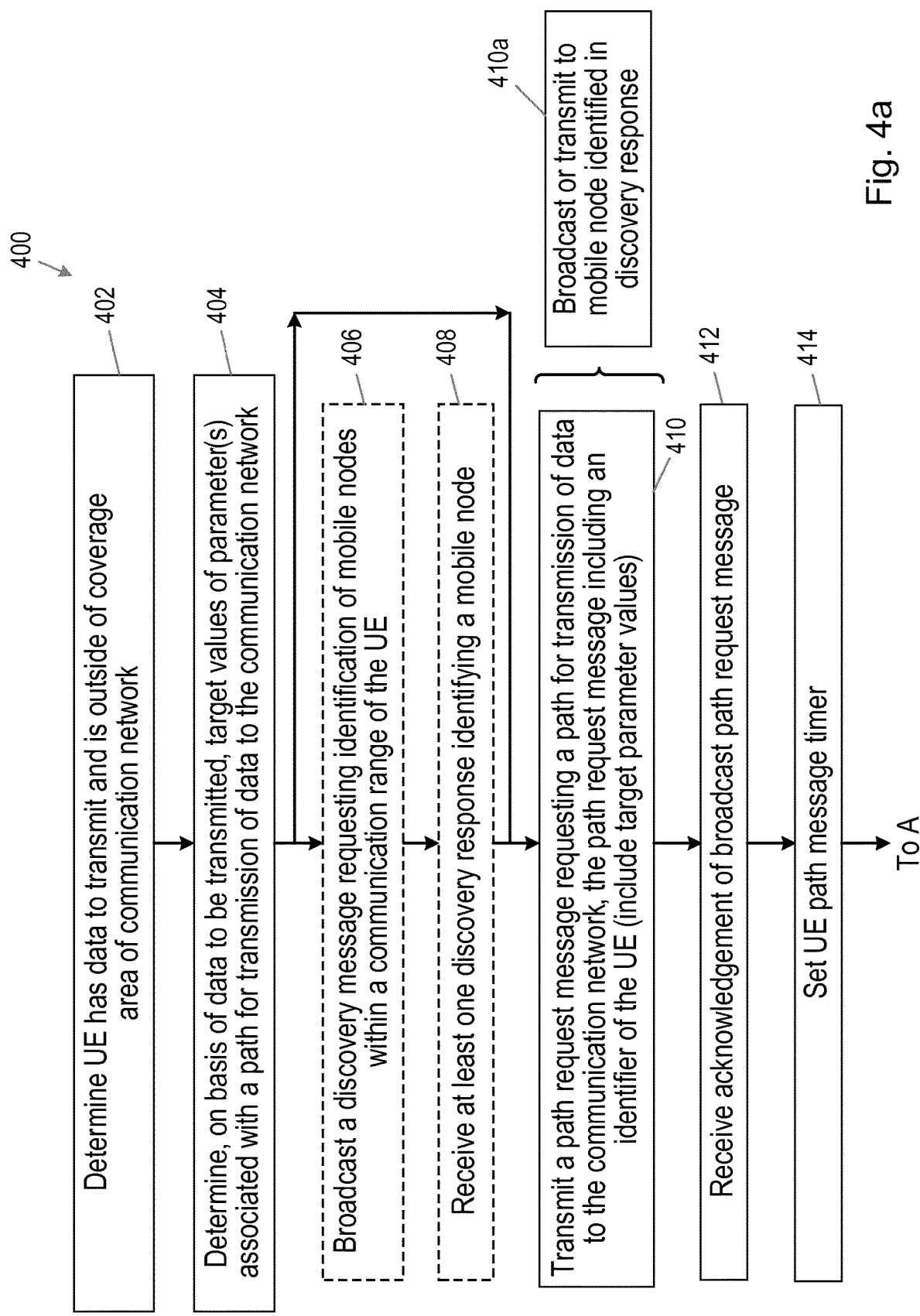
FIGS. 4a to 4c show a flow chart illustrating process steps in another example of method performed in a UE.
Figure 4B:
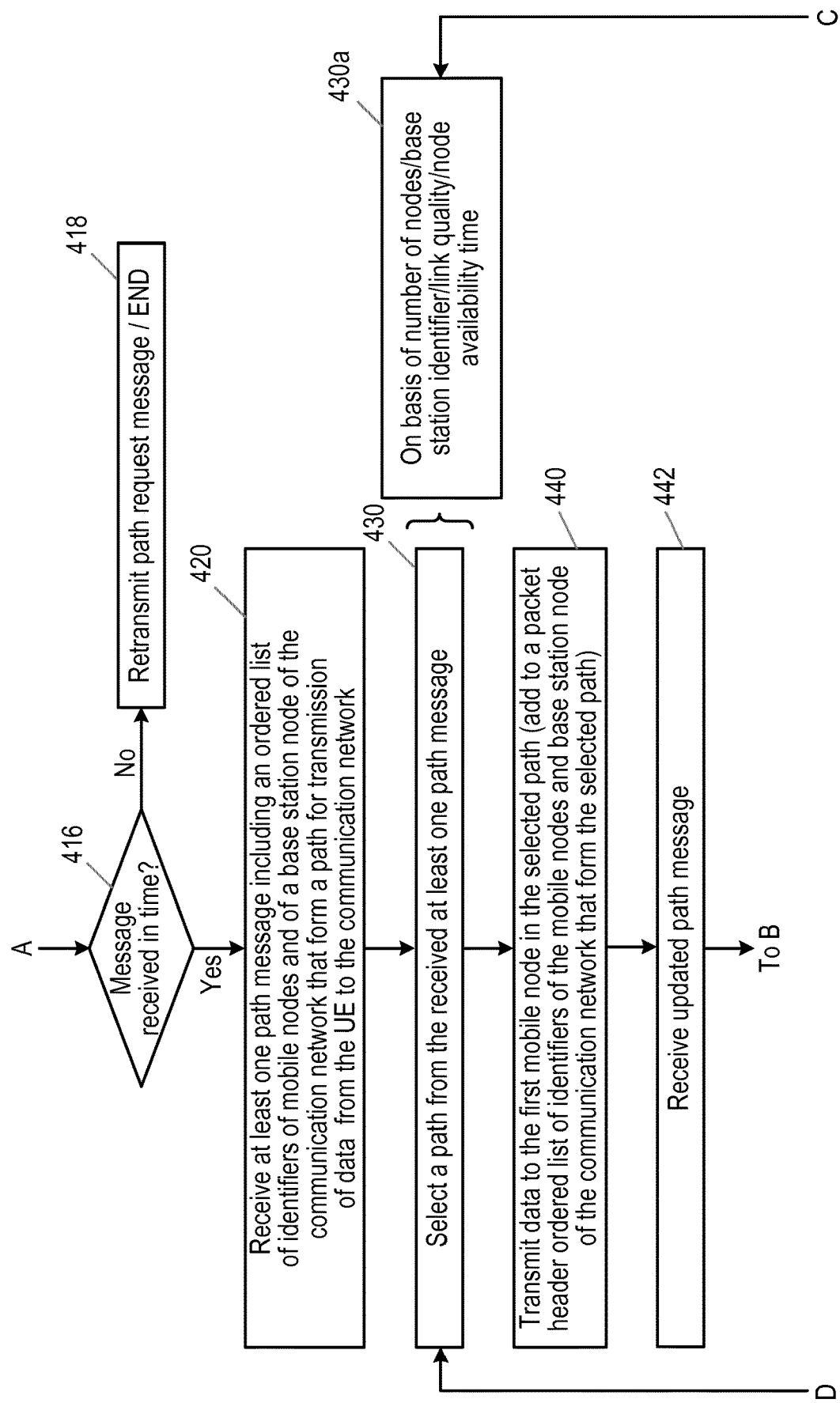
Figure 4C:
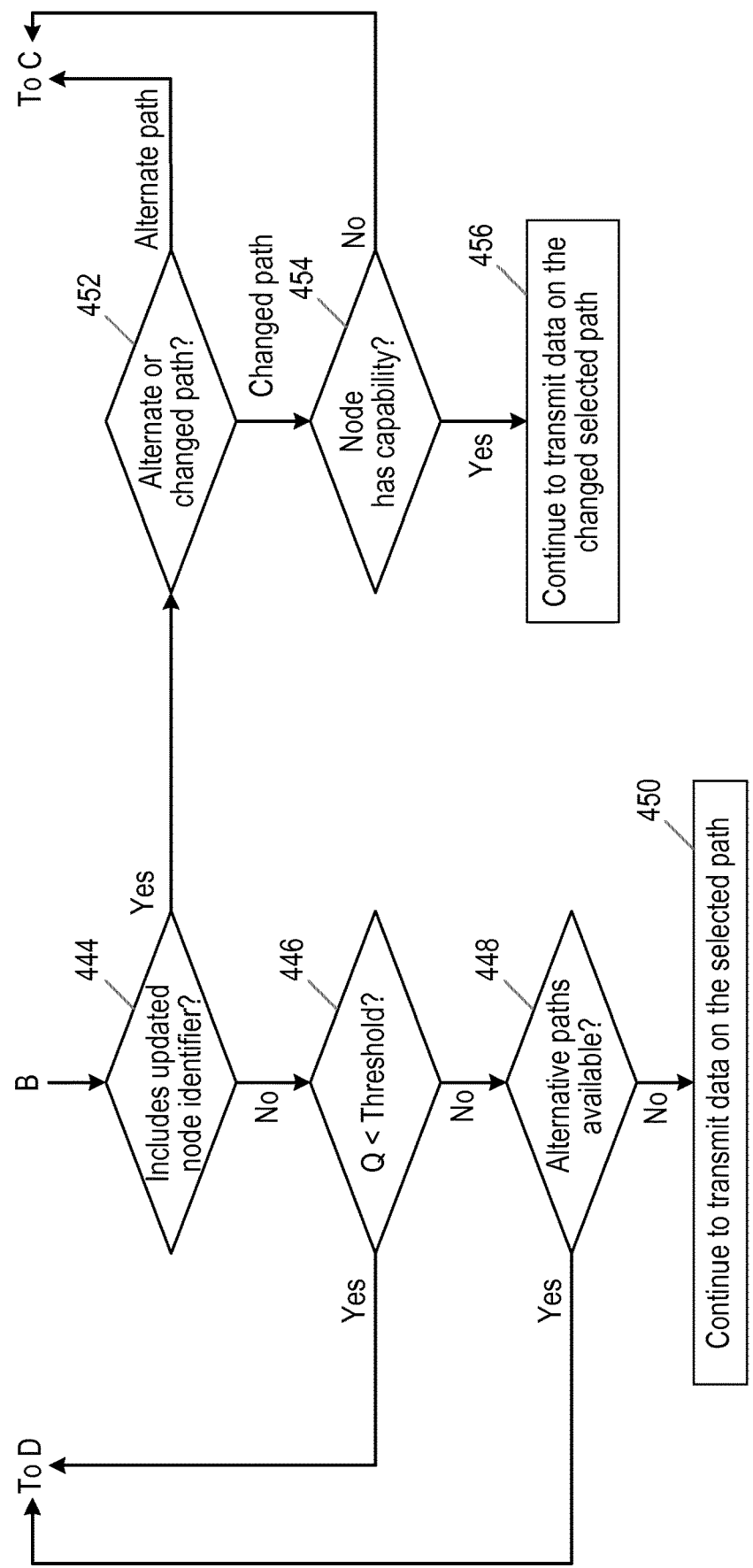

FIGS. 4a to 4c illustrate process steps in another example of method 400 performed in a UE that is operable to connect to a communication network. The steps of the method 400 illustrate one example way in which the steps of the method 300 may be implemented and supplemented to achieve the above discussed and additional functionality. Referring initially to FIG. 4a, in a first step 402, the UE determines that it is outside of a coverage area of the communication network, and that it has data for transmission to the communication network. In step 404, the UE determines, on the basis of the data to be transmitted to the communication network, target values of at least one parameter to be associated with a path for transmission of the data to the communication network. Examples of such parameters may include maximum number of hops in the path, node availability time of mobile nodes in the path, link availability time of links between nodes in the path, latency, radio link quality (such as path gain, RSRP, SINR) etc. It will be appreciated that the nature and quantity of the data to be transmitted may dictate certain requirements for the path over which the data is to be transmitted. These requirements may be translated into target values or ranges for the above listed or other parameters associated with a path to be requested for transmission of the data.

In some examples of the method 400, as illustrated in steps 406 and 408, the UE may perform discovery of mobile node in its vicinity. In other examples, as illustrated by the arrow leading directly from step 404 to step 410, this discovery process may be omitted. If discovery is performed, in step 406, the UE broadcasts a discovery message requesting identification of mobile nodes within a communication range of the UE, and, in step 408, the UE receives at least one discovery response to the broadcast discovery message, the discovery response identifying a mobile node. The mobile node may for example be a UAV or drone whose flight path causes it to pass within the communication range of the UE. It will be appreciated that the mobile node may be programmed with a primary task, such as delivery, surveillance, image capture, monitoring or any other task which may be performed by a UAV. The mobile node has communication capability to enable radio communication with the UE and with a base station of a communication network.

In step 410, the UE transmits a path request message requesting a path for transmission of data to the communication network, the path request message including an identifier of the UE and including any target path parameter values determined in step 404. The UE may also include a hop count parameter in the path request message, with a value of the hop count parameter set to an initial value, for example 1.

As illustrated in step 410a, if discovery was performed in steps 406 and 408, then transmitting a path request message in step 410 may comprise transmitting the path request message to at least one mobile node identified in the received discovery response message. If discovery was not performed, then the path request message may be broadcast by the UE in step 410. The UE may receive an acknowledgement of the broadcast or otherwise transmitted message in step 412.

On transmitting the path request message requesting a path for transmission of data to the communication network, the UE sets a UE path message timer in step 414 and, referring now to FIG. 4b, checks in step 416 whether or not a path message has been received before expiry of the UE path message timer. If the UE has not received at least one path message before expiry of the UE path message timer, (No in step 416), the UE performs at least one of aborting the method or transmitting a new path request message in step 418.

Alternatively, in step 420, the UE receives at least one path message in step 420 before expiry of the UE path message timer. As illustrated in step 420, the received at least one path message includes an ordered list of identifiers of mobile nodes and of a base station node of the communication network that form a path for transmission of data from the UE to the communication network. The at least one path message may further include at least one of a value of a link quality parameter indicating a quality of at least one link between nodes in the path for transmission of data to the communication network, and/or a value of a node availability time parameter indicating a time during which a node will be available for participation in the path formed by the nodes identified in the path message.

The UE may receive more than one path message, each path message including a different ordered list of mobile nodes and base station node. It will be appreciated that the ordered lists of different path messages may in some examples differ only slightly, for example sharing some mobile nodes or a base station node without representing identical paths. In step 430, the UE selects a path from the received at least one path message. As illustrated in step 430a, this may comprise selecting a path on the basis of at least one of:

a number of nodes in the path;
the identifier of the base station node in the path;
quality of at least one link between nodes in the path;
availability time of at least one node in the path.

The precise combination of factors used in selecting a path may depend upon the nature and quantity of the data to be transmitted. For example, in some circumstances, such as when the UE has a small amount of high value data for transmission, the UE may prioritize link quality over a long availability time of nodes participating in the path. In other circumstances, the UE may select the shortest path, the path that is available for the longest time period, or a path terminating at a particular base station.

In step 440, the UE transmits data to the first mobile node in the selected path. As illustrated in step 440, in one example, this may comprise adding, to a packet header of a packet of the data for transmission, an ordered list of the identifiers of the mobile nodes and base station node of the communication network that form the selected path for data transmission to the communication network. The data packet may then be transmitted along the path, as discussed in further detail below with reference to FIG. 7.

The remaining steps of FIGS. 4b and 4c illustrate UE behaviour facilitating update or change of a path for data transmission.

In step 442, the UE receives at least one updated path message, the updated path message including at least one of:

an updated value of a link quality parameter indicating a quality of at least one link between nodes in the path; and/or an updated identifier for a node in the path.

Referring now to FIG. 4c, in step 444, the UE checks whether the updated path message includes an updated identifier of a node in the path or not. If the updated path message does not include an updated identifier of a node in the path (No at step 444), the UE then checks in step 446 whether a value of a link quality parameter indicating a quality of a link between any of the nodes in the selected path has fallen below a threshold value. The threshold value may be configured in the UE and/or may be selected by the UE on the basis of the data for transmission over the path. If a value of a link quality parameter indicating a quality of a link between any of the nodes in the selected path has fallen below a threshold value (Yes in step 446), the UE initiates selection of an alternative path and transmits data to the first mobile node in the selected alternative path. As illustrated in FIGS. 4c and 4b, initiating selection of an alternative path may comprise returning to step 430 and selecting a new path on the basis of path messages that have already been received. In another example, (not shown), initiating selection of an alternative path may comprise returning to step 410 and transmitting a new path request message to prompt receipt of new path messages, and selecting a new path from the newly received path messages. This may enable to the UE to take advantage of a change in the configuration of mobile nodes between its location and the closest base stations of the communication network. In some examples, during selection of an alternative path, the UE may continue transmitting data on the selected path or may pause data transmission until a new path is selected. The decision as to whether to pause or continue transmission during selection of an alternative path may be based on factors including link quality parameter values, nature of the data for transmission etc.

Returning to FIG. 4c, if a value of a link quality parameter indicating a quality of a link between any of the nodes in the selected path has not fallen below a threshold value (no in step 446), the UE determines, in step 448, whether or not alternative paths have become available since selection of the currently selected path. If no alternative paths have become available (No in step 448), the UE continues to transmit data on the currently selected path in step 450. If alternative paths have become available (Yes in step 448), the UE returns to step 430 and selects a path for transmission of data to the communication network from among currently available paths before transmitting data to the first mobile node in the newly selected path. It will be appreciated that the currently available paths may include the currently selected path, such that if none of the alternative paths that have become available since selection of the current path represent an improvement on the current path, the current path may be reselected.

Referring still to FIG. 4c, if the at least one updated path message received at step 442 includes an updated identifier for a node in the path (Yes at step 444), the UE checks in step 452 whether the updated path message indicates an alternative path available for selection by the UE or a change to the selected path. This checking step may for example comprise checking for a parameter or flag in the updated path message that will distinguish between an alternative path available for selection by the UE or a change to the selected path. If the updated path message indicates an alternative path available for selection by the UE, the UE may return to step 430 to select a path for transmission from among available paths including that signalled by the updated path message, or may store the updated path message for later consideration of alternative paths.

If the updated path message indicates a change to the selected path, the UE then determines, at step 454, whether or not a node in the selected path that has reported the change to the selected path has a path selection capability. The node that has reported the change to the selected path may comprise a node that is downstream of the changed node in the path, i.e. one hop closer to the UE. Checking a path selection capability of this node may comprise checking a parameter or flag relating to this node and included in the updated path message. If the node in the selected path that has reported the change to the selected path does have a path selection capability (Yes in step 454), the UE continues to transmit data on the changed selected path in step 456. If the node in the selected path that has reported the change to the selected path does not have a path selection capability (No in step 456), the UE may initiate selection of an alternative path. As discussed above, initiating selection of an alternative path may comprise transmitting a new path request message to prompt receipt of new path messages, and selecting a new path from the newly received path messages, or may comprise selecting a new path on the basis of path messages that have already been received. The changed selected path may be among the paths from which the UE selects, but if the node reporting the change to the selected path does not have a path selection capability, the responsibility for selecting that path may be assumed by the UE, rather than trusting the node to have changed the selected path for the better.

In further examples of the present disclosure (not shown), consideration of alternative paths and selection of a new path may also be triggered by an update timer, in addition to being triggered by receipt of an updated path message. The update timer may initiate a periodic consideration of alternative paths, or may be linked to a reported availability time of one or more nodes in the path.

Figure 5:
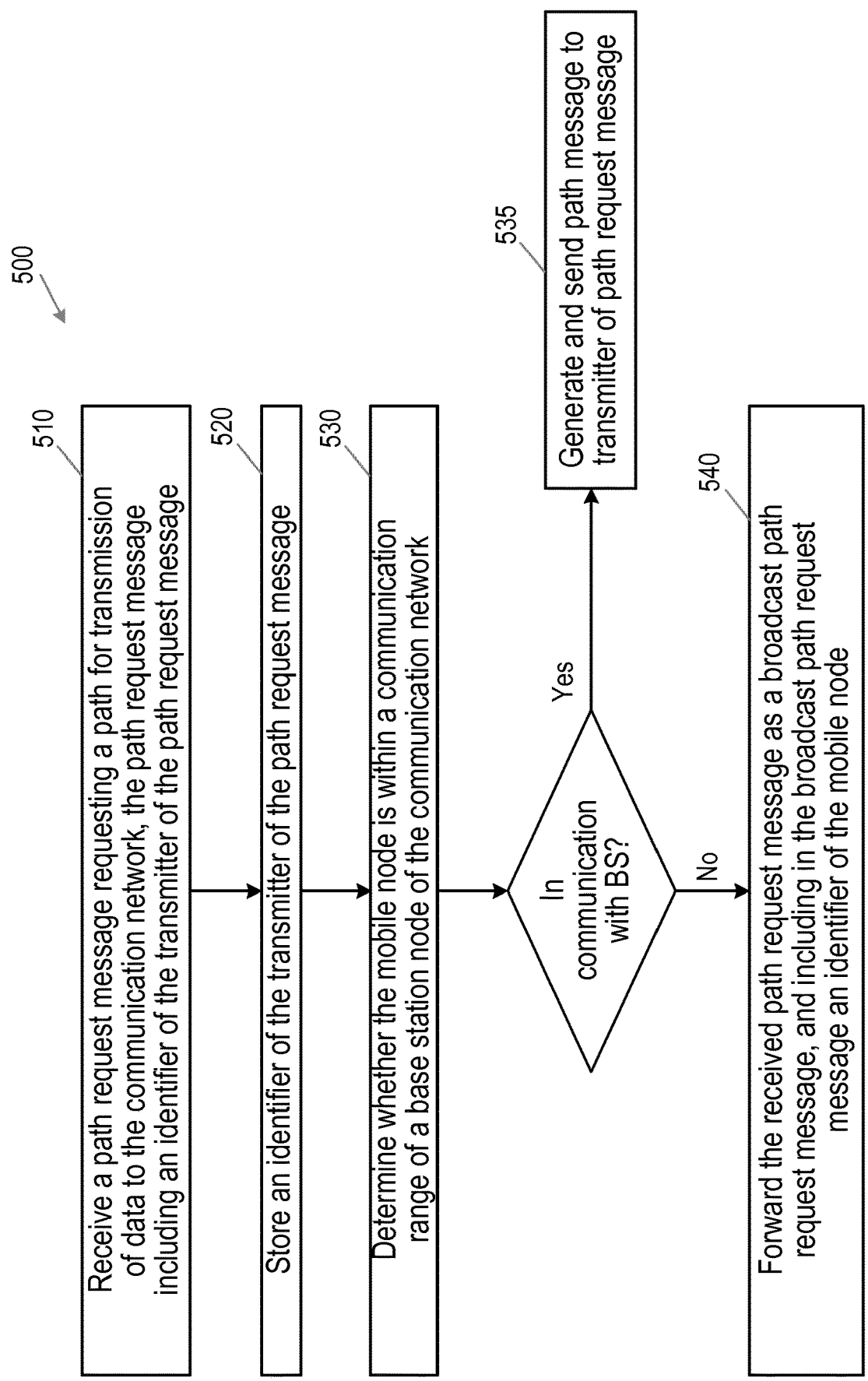
FIG. 5 shows a flow chart illustrating process steps in a method performed in a mobile node.

It will be appreciated that the method 400 described above is performed at least in part on the basis of path messages received from one or more mobile nodes. FIG. 5 illustrates process steps in a method 500 which may be performed by a mobile node that is operable to connect to a communication network. The method 500 may compliment the methods 300 and/or 400, performed in a UE. The mobile node may in some examples be a UAV or drone.

Referring to FIG. 5, in a first step 510, the method 500 comprises receiving a path request message requesting a path for transmission of data to the communication network, the path request message including an identifier of the transmitter of the path request message. The method 500 then comprises, in step 520, storing an identifier of the transmitter of the path request message, and, in step 530, determining whether the mobile node is within a communication range of a base station node of the communication network. If the mobile node is within a communication range of a base station node of the communication network, the method may further comprise generating and sending a path message to a transmitter of the path request message in step 535. The generating and transmitting of such a message is discussed in further detail below with reference to FIG. 6c and steps 632, 634 and 636. If the mobile node is not within a communication rage of a base station node of the communication network, the method 500 comprises forwarding the received path request message as a broadcast path request message in step 540, and including in the broadcast path request message an identifier of the mobile node.

In some examples, of the method 500, the identifier of the mobile node may replace the identifier of the transmitter of the path request message in the forwarded broadcast path request message. In other examples, the identifier of the transmitter, and any list of preceding transmitters, may be maintained in the message, with the identifier of the mobile node performing the method added to the list. Maintaining such a list may for example assist with avoiding a situation in which a path request message is re-forwarded by a mobile node that has already received and forwarded it.

According to different examples of the present disclosure, the transmitter of the received path request message may be a UE or may be another mobile node. In some examples, the method may further comprise receiving and responding to a broadcast discovery message from a UE, before receiving the transmitted path request message.

Figure 6A:
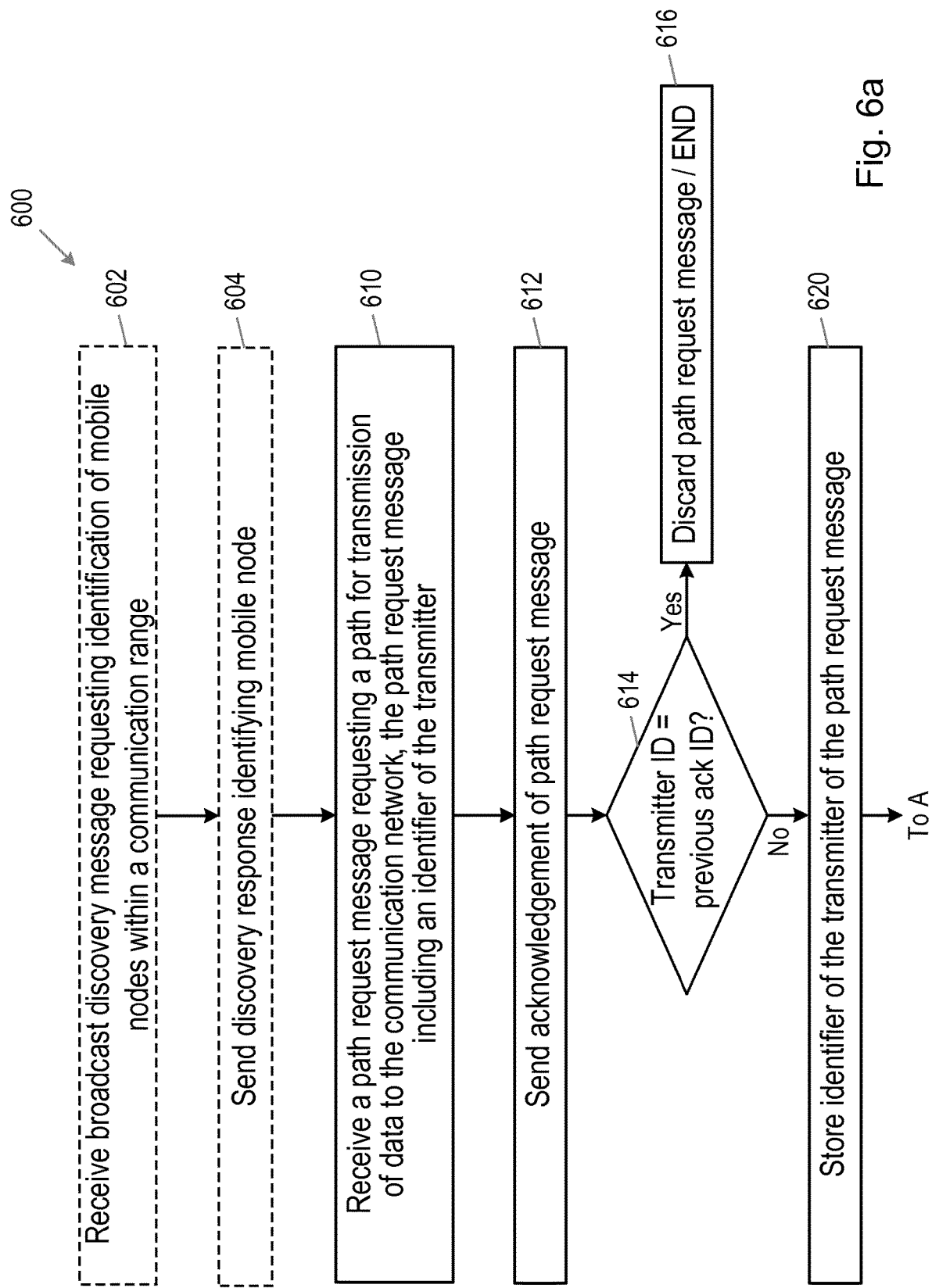
FIGS. 6a to 6f show a flow chart illustrating process steps in another example of method performed in a mobile node.

FIGS. 6a to 6f illustrate process steps in another example of method 600 performed in a mobile node that is operable to connect to a communication network. The mobile node may comprise a UAV or drone. The steps of the method 600 illustrate one example way in which the steps of the method 500 may be implemented and supplemented to achieve the above discussed and additional functionality. Referring initially to FIG. 6a, in a first optional step 602, the mobile node may receive a broadcast discovery message requesting identification of mobile nodes within a communication range of the sender. In a further optional step 604, the mobile node may send a discovery response to the received broadcast message, the discovery response including an identifier of the mobile node. The discovery message may in some examples be received from a UE.

In step 610, the mobile node receives a path request message requesting a path for transmission of data to the communication network, the path request message including an identifier of the transmitter of the path request message. The path request message may include one or more target values or ranger for parameters associated with the requested path, and/or a hop count parameter. The transmitter of the path request message may be a UE or may be another mobile node. In step 612, the mobile node sends an acknowledgement of path request message to the transmitter of the path request message, the acknowledgement of path request message including an identifier of the mobile node.

On receipt of the path request message, the mobile node may, in step 614, compare the identifier of the transmitter of the path request message with an identifier of any previously received acknowledgement of broadcast path request messages. If the identifier of the transmitter of the path request message is the same as an identifier of any previously received acknowledgement of broadcast path request messages (Yes at step 614), the mobile node may discard the received broadcast message in step 616. This may in some examples enable a mobile node that has forwarded a path request message to recognise that same path request message if it is in turn forwarded on as a broadcast message by the receiving mobile node.

Figure 6B:
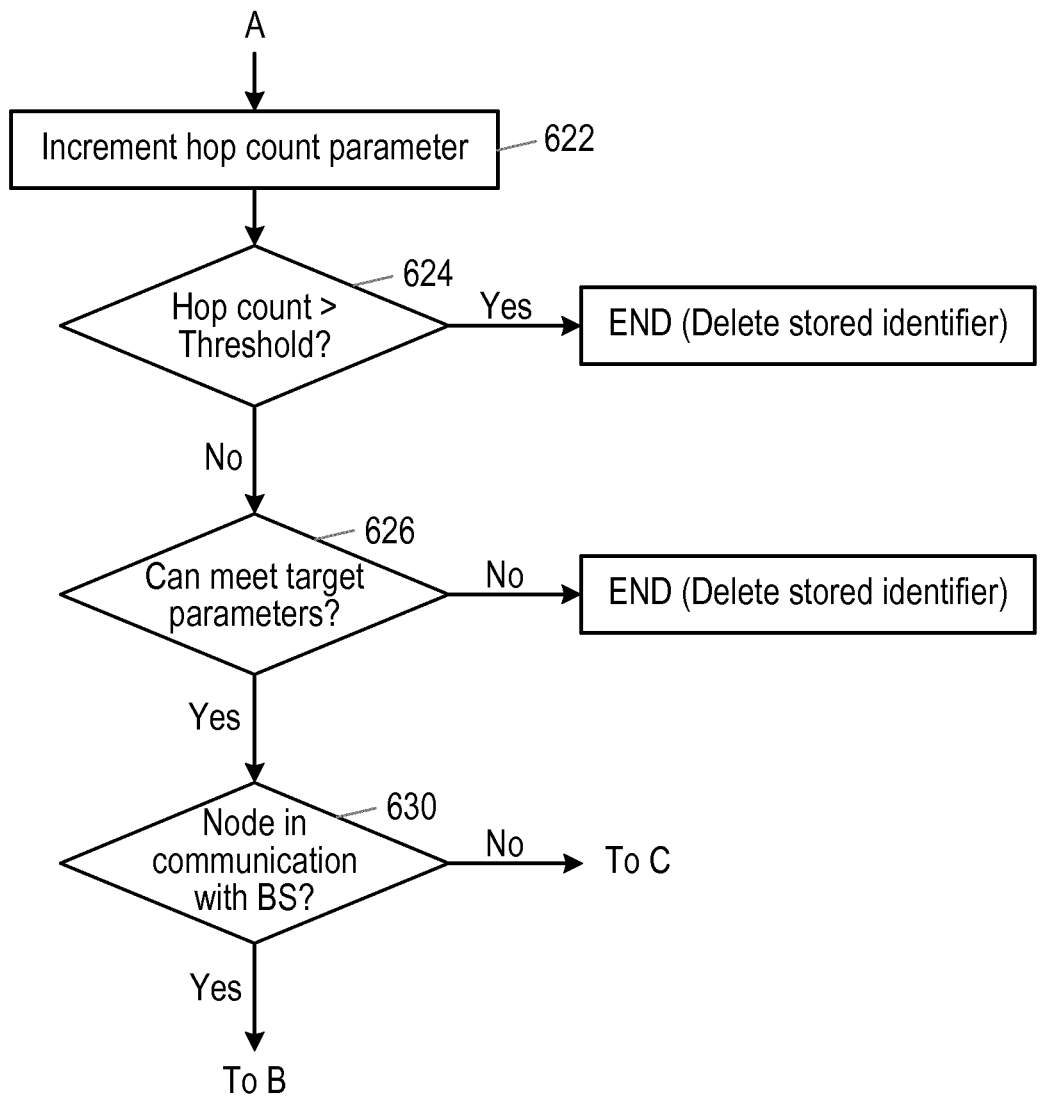

In step 620, the mobile node stores an identifier of the transmitter of the path request message. Referring now to FIG. 6b, and in the case that the received path request message includes a hop count parameter, the mobile node increments the value of the hop count parameter in step 622 and checks, at step 624, whether or not the incremented value of the hop count parameter exceeds a threshold. If the incremented value of the hop count parameter exceeds a threshold (yes in step 624) the mobile node discards the path request message and aborts the method. At this stage the mobile node may delete the stored identifier of the transmitter of the path request message. The hop count parameter thus allows for a maximum path length to be configured in the form of a threshold value of the hop count parameter, above which a path request message is discarded.

If the incremented value of the hop count parameter does not exceed the threshold (No in step 624), the mobile node proceeds to check in step 626 whether or not at least one of the mobile node or a link between the mobile node and at least the transmitter of the received path request message can meet any target parameter values or ranges included in the path request message for the requested path. As discussed above, examples of parameters associated with the requested path may include maximum number of hops in the path, node availability time of mobile nodes in the path, link availability time of links between nodes in the path, latency, radio link quality (such as path gain, RSRP, SINR) etc.

If at least one of the mobile node or link cannot meet the target values or ranges (no at step 626), the mobile node discards the path request message and aborts the method. At this stage the mobile node may delete the stored identifier of the transmitter of the path request message (see step 612). If the mobile node and link can meet the target values (Yes at step 626), the mobile node proceeds to check in step 630 whether or not it is within a communication rage of a base station node of the communication network. This may for example comprise checking for receipt of reference or other signals emitted by such a base station node.

Figure 6C:
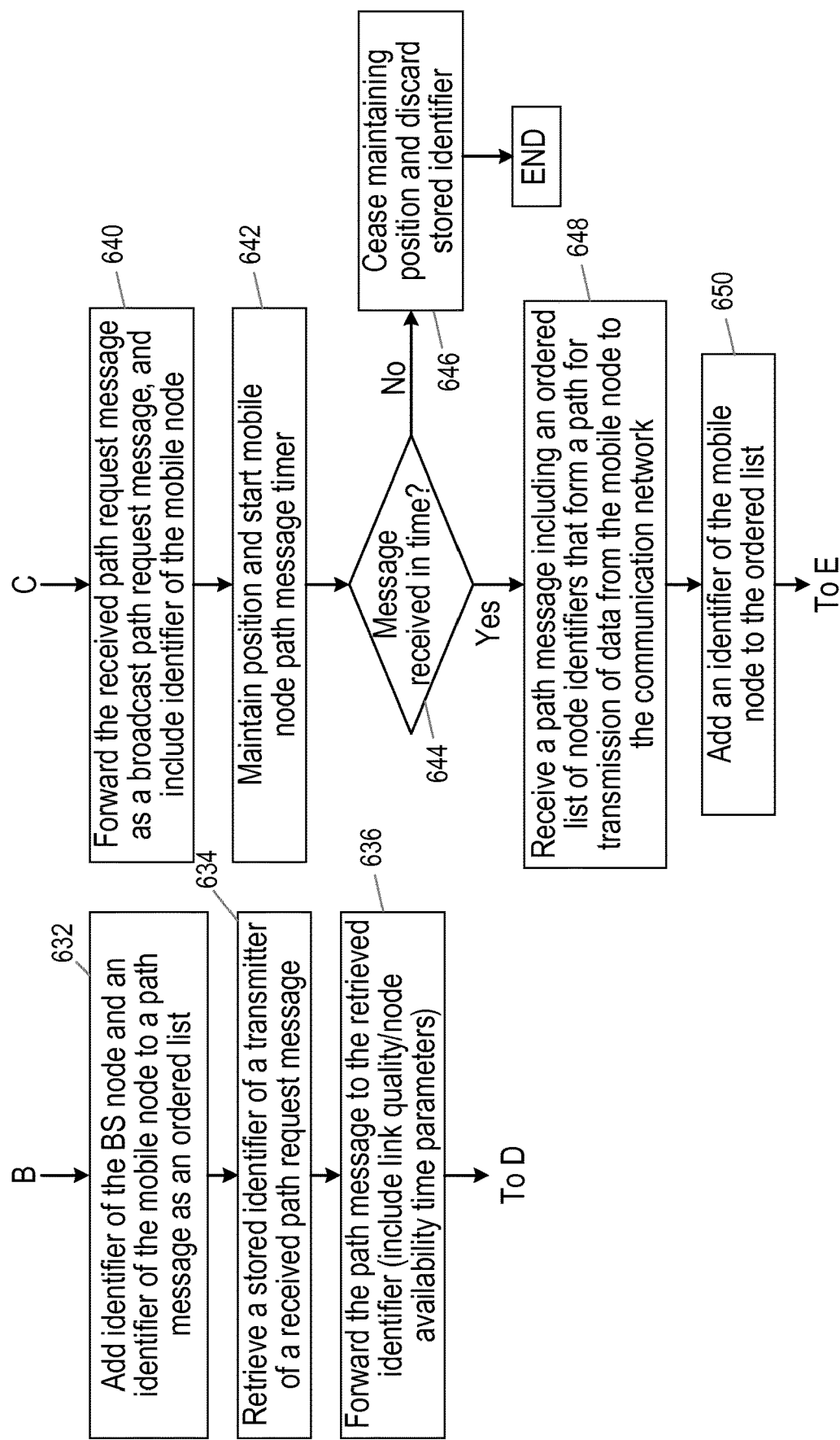

Referring now to FIG. 6c, if the mobile node is within a communication rage of a base station node of the communication network (Yes at step 630), the mobile node proceeds to step 632. In step 632 the mobile node adds an identifier of the base station node of the communication network with which the mobile node can communicate, and an identifier of the mobile node, to a path message as an ordered list of identifiers of mobile nodes and of a base station node of the communication network that form a path for transmission of data from the mobile node to the communication network. In step 634, the mobile node then retrieves a stored identifier of a transmitter of a received path request message and, in step 636, forwards the path message to the retrieved identifier. The mobile node includes in the forwarded path message at least one of:

a value of a link quality parameter indicating a quality of a link between the mobile node and at least one of the transmitter of the received path request message or the base station node, and/or a value of a node availability time parameter: availability_time, indicating a time during which the mobile node will be available for participation in the path formed by the nodes identified in the forwarded path message. The value of the node availability time parameter may be generated by the mobile node on the basis of its primary and any secondary or other programmed tasks and the compatibility of these tasks with remaining in position to participate in the transmission path. For example, if the mobile node is required to make a delivery or to perform measurements or film or photograph at a specific location at a specific time, this may limit the availability of the node for extended participation in the transmission path. The time availability parameter may also or alternatively be based on energy constraints such as battery life, distance remaining to destination etc. The availability_time will provide information to previous nodes and/or UE about how long the mobile node will be available for data transmission (in case node is part of a selected path).

Figure 6D:
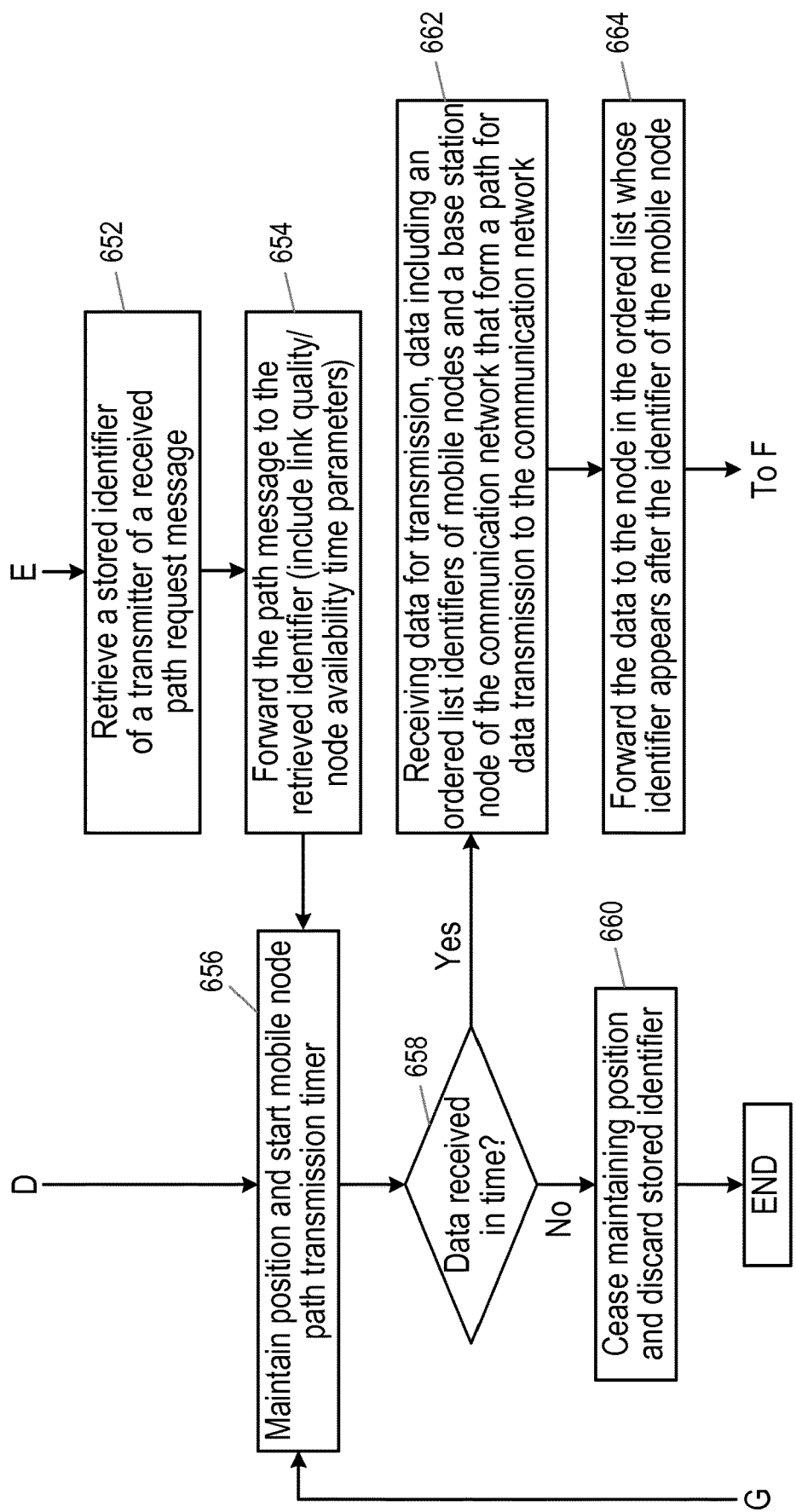

The mobile node then proceeds to step 656, illustrated in FIG. 6d. Before continuing the discussion of steps 656 onward, behaviour if the mobile node is not within a communication range of a base station node of a communication network is described.

Referring still to FIG. 6c, if the mobile node is not within a communication rage of a base station node of the communication network (No at step 630), the mobile node forwards the received path request message as a broadcast path request message in step 640. The mobile node includes in the forwarded path request message its own identifier and replaces the hop count parameter value in the received path request message with the incremented hop count parameter value. In some examples, the identifier of the mobile node may replace the identifier of the transmitter of the path request message in the forwarded broadcast path request message. In other examples, the identifier of transmitter, and any list of preceding transmitters, may be maintained in the message, with the identifier of the mobile node added to the list. Maintaining such a list may for example assist with avoiding a situation in which a path request message is re-forwarded by a mobile node that has already received and forwarded it.

On forwarding the path request message as a broadcast message in step 640, the mobile node starts a mobile node path message timer, and maintains a current position of the mobile node in step 642. If at least one path message has not been received before expiry of the mobile node path message timer (No in step 646) the mobile node ceases to maintain the current position of the mobile node in step 646 and discards the stored identifier from step 620. Discarding the stored identifier from step 620 may ensure that a later received path message is not sent back along a chain of nodes that no longer exists, and also avoid maintaining an overly long list of all nodes that have at one time sent path request messages.

Alternatively, the mobile node may receive a path message before expiry of the mobile node path message timer. In step 648, the mobile node receives a path message including an ordered list of identifiers of mobile nodes and of a base station node of the communication network that form a path for transmission of data from the mobile node to the communication network. Referring to FIG. 6d, in step 650, the mobile node adds an identifier of the mobile node to the ordered list included in the received path message. The identifier of the mobile node may be added to an end of list, with the identifier of the base station node being at an opposite end of the list. In step 652, the mobile node retrieves a stored identifier of a transmitter of a received path request message and, in step 654, the mobile node forwards the path message to the retrieved identifier. In the event of more than one stored identifier, the mobile node forwards the path message to all of the stored identifiers in step 654. The mobile node may include in the forwarded path message at least one of:

a value of a link quality parameter indicating a quality of a link between the mobile node and at least one of the transmitter of the received path message or the transmitter of the received path request message, and/or a value of a node availability time parameter indicating a time during which the mobile node will be available for participation in the path formed by the nodes identified in the forwarded path message. As discussed above, the value of the node availability time parameter may be generated by the mobile node on the basis of its primary and any secondary or other programmed tasks and the compatibility of these tasks with remaining in position to participate in the transmission path. The time availability parameter may also or alternatively be based on energy constraints such as battery life, distance remaining to destination etc. The availability_time will provide information to previous nodes and/or UE about how long the mobile node will be available for data transmission (in case node is part of a selected path).

On forwarding the path message to the retrieved identifier, either at step 654 or at step 636, the mobile node then starts a mobile node transmission timer and maintains a current position of the mobile node in step 656. If data for transmission has not been received before expiry of the mobile node transmission timer (No at step 658), the mobile node ceases to maintain the current position of the mobile node in step 660 and discards the stored identifier from step 620. Alternatively, in step 662, the mobile node receives data for transmission before expiry of the mobile node transmission timer. As illustrated in step 662, the data includes an ordered list of identifiers of mobile nodes and a base station node of the communication network that form a path for data transmission to the communication network. The mobile node then, in step 664, forwards the data to the node in the ordered list whose identifier appears after the identifier of the mobile node. This may be another mobile node or may be a base station node of the communication network. The mobile node may additionally start a session timer at this step (not shown). If an additional data packet is received before expiry of the session timer, then the mobile node may return to step 662, receiving the data packet and forwarding the data packet in step 664. If an additional data packet is not received before expiry of the session timer, then the mobile node deems the session to have ended, and may proceed to step 660, ceasing to maintain position and discarding the stored identifier from step 620.

Figure 6E:
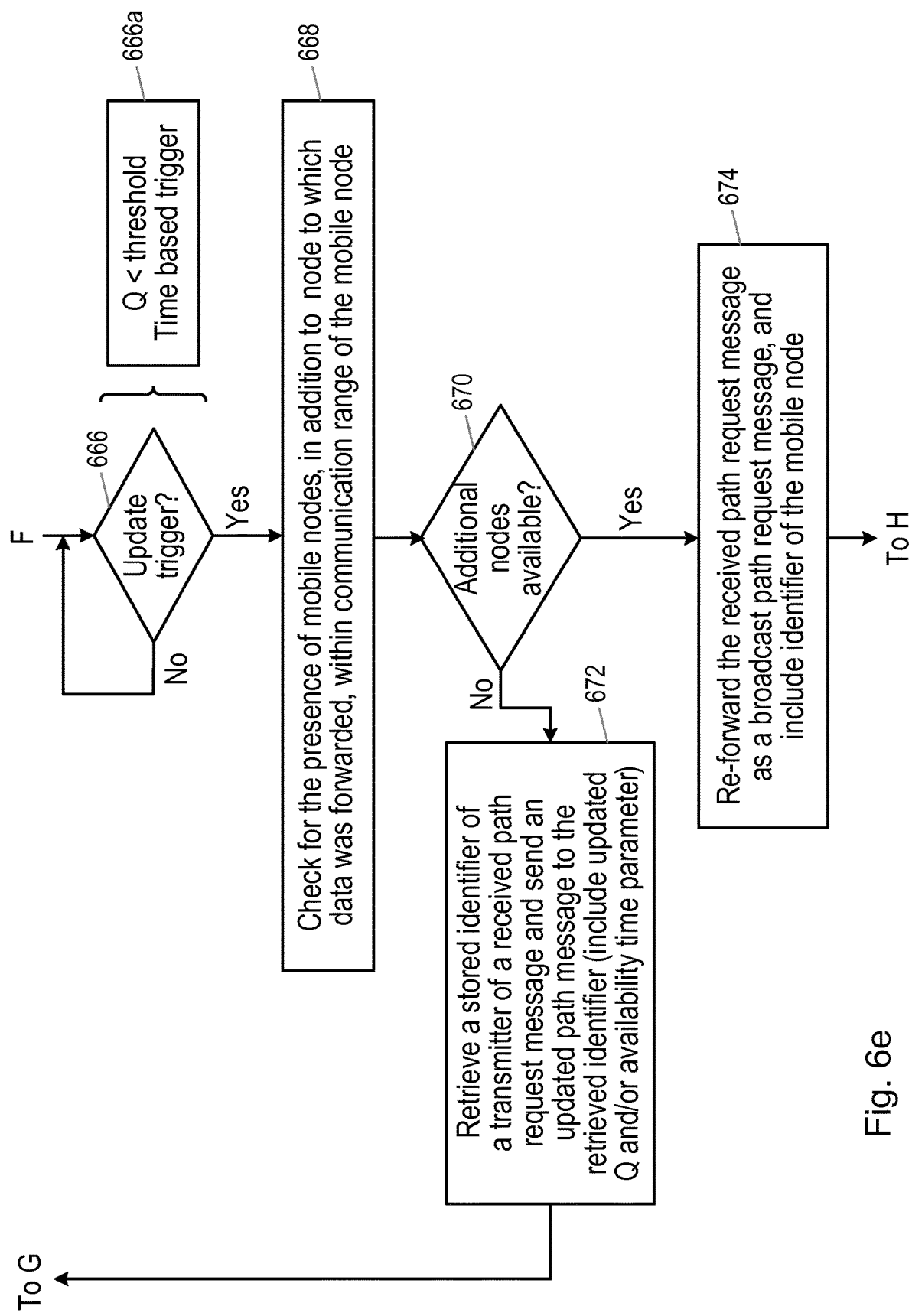
Figure 6F:
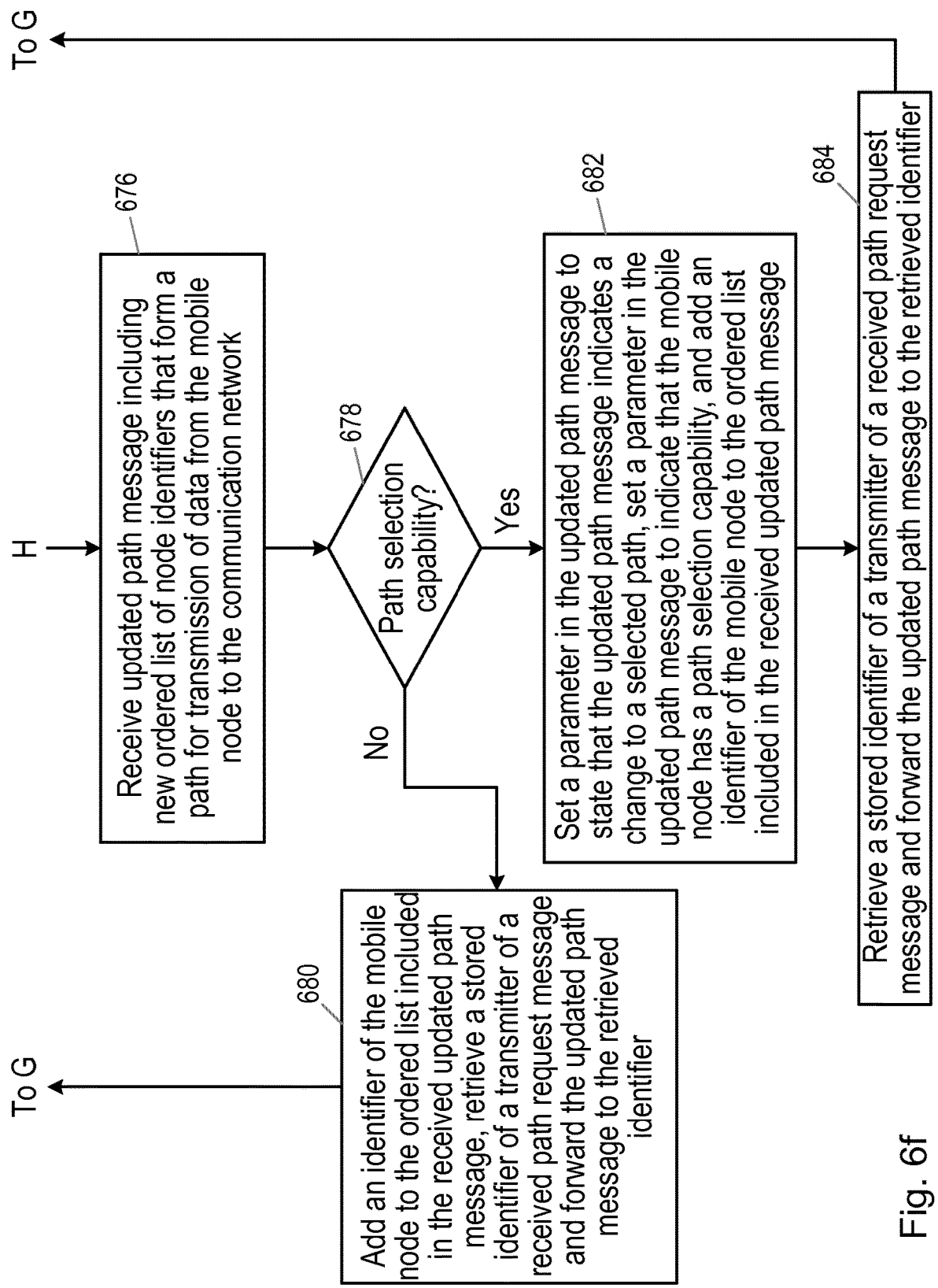

The remaining steps of FIGS. 6e and 6f illustrate mobile node behaviour facilitating update or change of a path for data transmission.

Referring now to FIG. 6e, following forwarding of the received data, and responsive to a path update trigger in step 666, the mobile node checks in step 668 for the presence of mobile nodes, in addition to a node to which the data was forwarded, within a communication range of the mobile node. As illustrated in step 666a, the path update trigger may be a time based trigger, instigating a periodic or scheduled check for additional nodes, or may be a threshold based trigger indicating for example that a value of a link quality parameter indicating a quality of a link between the mobile node and another node in the path has fallen below a threshold value.

If additional mobile nodes, in addition to the mobile node to which data has been forwarded, are not present (No at step 670), the mobile node proceeds to step 672, retrieving a stored identifier of a transmitter of a received path request message and sending an updated path message to the retrieved identifier. The updated path message includes an updated value of at least one of a link quality parameter indicating a quality of a link between the mobile node and at least one of the transmitter of the received path message or the transmitter of the received path request message, and/or a node availability time parameter indicating a time during which the mobile node will be available for participation in the path formed by the nodes identified in the forwarded path message.

After sending the updated path message, the mobile node returns to step 656, maintaining position, setting a mobile node path transmission timer and awaiting the receipt of data for transmission.

If additional mobile nodes are present (Yes in step 670), the mobile node re-forwards the received path request message as a broadcast path request message in step 674, including in the broadcast path request message an identifier of the mobile node. Referring now to FIG. 6f, the mobile node receives an updated path message in step 676, the updated path message including a new ordered list of identifiers of mobile nodes and of a base station node of the communication network that form a path for transmission of data from the mobile node to the communication network. In step 678, the mobile node checks whether or not it has a path selection capability. If the mobile node does not have a path selection capability (No at step 678), the mobile node proceeds to step 680. In step 680, the mobile node adds an identifier of the mobile node to the ordered list included in the received updated path message, retrieves a stored identifier of a transmitter of a received path request message, and forwards the updated path message to the retrieved identifier. The updated path message may additionally include updated parameter values for link quality and availability time, as discussed above. This updated path message will be transferred back along the chain of mobile nodes in the path to the UE requesting the path. In this manner, the mobile node informs the UE of a newly available path option but leaves the decision as to whether the newly available path option is an improvement on the existing path to the UE.

As discussed above in relation to step 672, after sending the updated path message, the mobile node returns to step 656, maintaining position, setting a mobile node path transmission timer and awaiting the receipt of data for transmission.

If the mobile node has a path selection capability (Yes at step 678), the mobile node proceeds to step 682. In step 682, the mobile node sets a parameter in the updated path message to state that the updated path message indicates a change to a selected path, and also sets a parameter in the updated path message to indicate that the mobile node has a path selection capability. The mobile node adds an identifier of the mobile node to the ordered list included in the received updated path message, and may additionally update link quality and time availability parameters. In step 684, the mobile node retrieves a stored identifier of a transmitter of a received path request message and forwards the updated path message to the retrieved identifier. In some examples, (not shown), step 682 may be preceded by an assessment step, in which an assessment is made as to whether or not the path in the updated path message represents an improvement upon the path that is currently being used for data transmission.

As discussed above in relation to step 672, after sending the updated path message, the mobile node returns to step 656, maintaining position, setting a mobile node path transmission timer and awaiting the receipt of data for transmission.

In a further example of the present disclosure (not shown), a mobile node may cease operation of the method, and/or participation in a transmission path, if this becomes incompatible with performance of one or more of the mobile node's programmed tasks. For example, if the availability time calculated by the node expires, the node may cease maintaining position and continue with programmed tasks.

FIGS. 3 to 6f thus illustrate how methods performed in a UE and one or more mobile nodes may enable opportunistic routing from the UE to a communication network, through the formation of a transmission path comprising one or more mobile nodes. The path is established via the passage of a path request message outwards from the UE, from node to node in search of a mobile node that is within communication range of a base station node of the communication network. Each mobile node stores the identity of the node from which it received the path request message. Once a mobile node that is within communication range of a base station node of the communication network is reached, a path message is passed back along the chain of mobile nodes to the UE, each mobile node retrieving the stored identifier from the passage of the path request message. Each mobile node adds its identifier to the path message, so forming the ordered list of identifiers that defines the data transmission path. Once arrived at the UE, the path message contains mobile node identifiers representing a complete path to the communication network, allowing the UE to select the most favourable path available. The methods may be considered to represent several distinct phases including: path discovery, path selection, data transmission and path update. Each of these phases is considered below in the context of example implementations of the above discussed methods, as illustrated in FIGS. 7 and 8.

Figure 7:
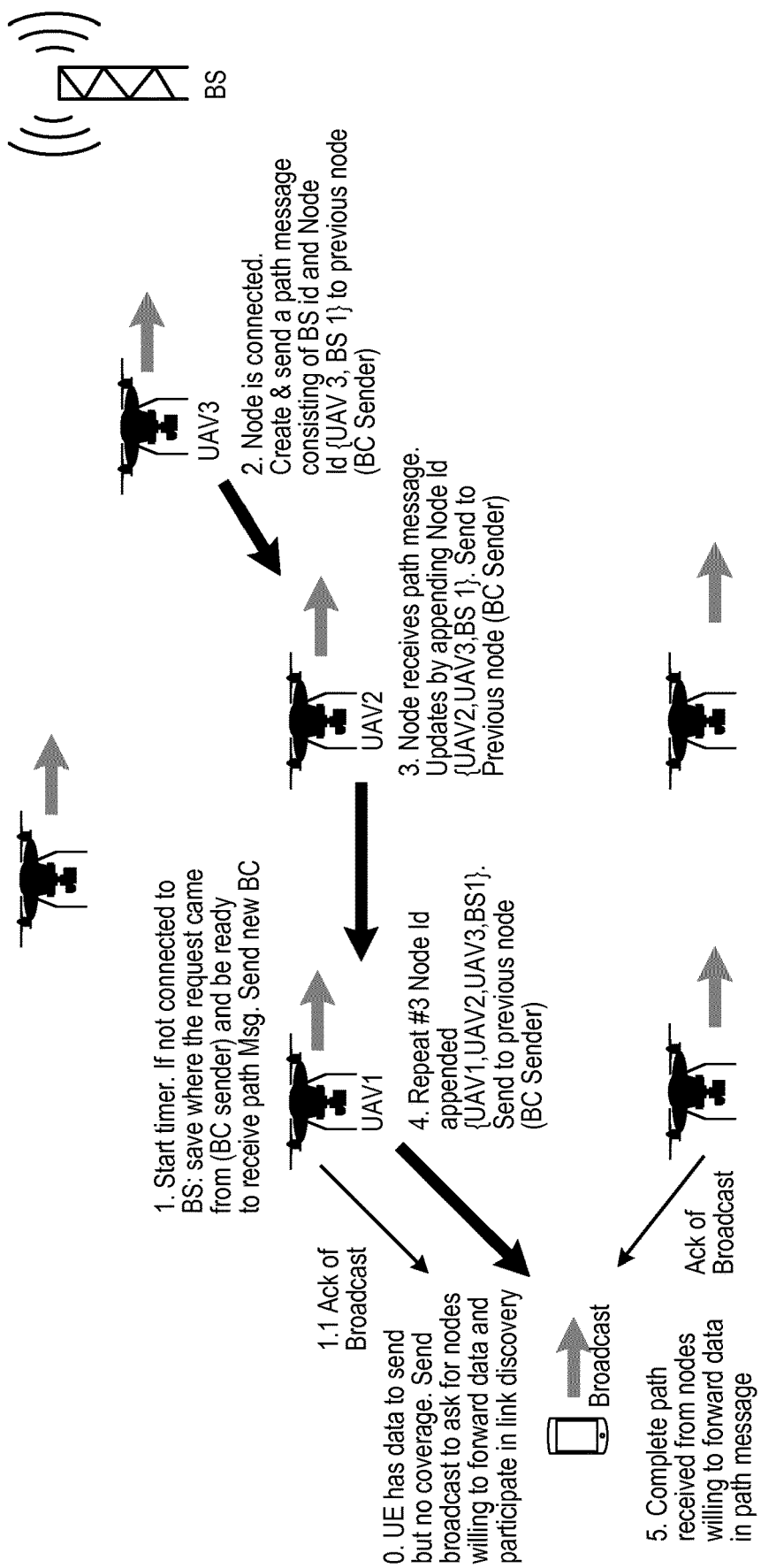
FIGS. 7 and 8 illustrate implementations of methods illustrated in FIGS. 3 to 6f.
Figure 8:
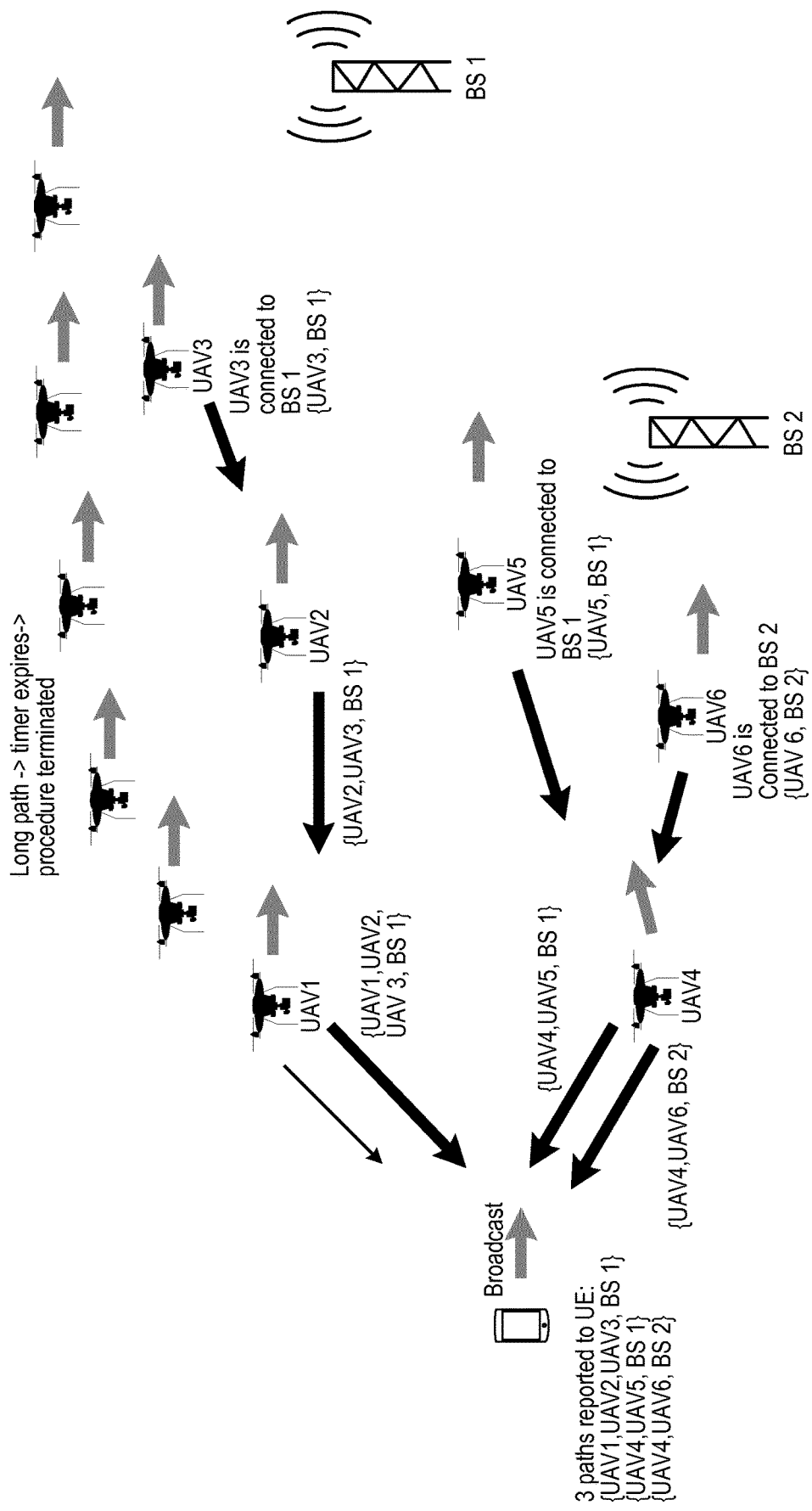

Referring to FIG. 7, in step 0, a UE has data to transmit but has no network access. The UE may send broadcast discovery messages to find moving nodes in the proximity prior to sending a path_request message. Alternatively, as illustrated in step 0, the UE broadcasts, in an opportunistic manner, a path_request message both to find moving nodes and to request for assistance to find a route. A mobile node receiving the path_request message forwards the message on, assuming it is not connected to a base station, and starts a timer in step 1. The mobile node stores the sender of the path_request message and may additionally send an acknowledgement of the broadcast in step 1.1. Each node that receives a request stores the requesting node_id. The broadcasting of requests continues (within a limited number of hops, <max_hop_count, if such a count is applied) until reaching a node that has access to an end destination (e/gNB). The node that has access to end destination returns an "ACK" path message to the source UE, as illustrated in step 2. The path message contains the complete path list together with link quality measurements for each link. The path message is sent back down the chain to the source UE using the same path list, as illustrated in steps 3 and 4, with each node adding its identity to the path list. The path message is received at the UE in step 5, by which time the complete path list is: {UE, UAV1, UAV2, UAV3, BS1}. As discussed above, each mobile node may also determine, upon receiving a path_request, if its present operation (programmed task or operational conditions) is compatible with participation in the route discovery and data transmission process, for example on the basis of remaining battery life, time during which the mobile node can be available in its current location, etc.

FIG. 7 illustrates path discovery, through the exchange of path_request and path messages. As the source UE may perform discovery, or broadcast its path_request message, to more than one mobile node in its proximity, there is a probability that more than one path may be found, that is the source UE may receive more than one path message each with its own unique path list. This is depicted in an example in FIG. 8. In FIG. 8 it can be seen that the UE has received three different path lists. The UE seeking to transmit data can select any of the paths contained in the received path messages. The paths are identified with the UAV numbers, the number of hops and the destination base station ID. In one example, the path selected by the UE remains unchanged during a data session. The mobile nodes belonging to the path are aware of the time period during which they need to remain in their current positions to participate in the data transmission path. In other examples, as discussed below, the path selected by the UE may change during a data session.

For each packet, the source UE adds the path-list for the selected path to the packet, so each mobile node knows if the packets are meant for them and where to further relay the packet. Referring still to FIG. 8, the source UE has three paths to select from. In one example, the source UE selects the path {UAV4, UAV6, BS2}, as this path has the fewest hops. The path-list {UAV4, UAV6, BS2} is then added to the packet header of a data packet for transmission. During its next packet transmission session, the UE may select the same path or a different path. The UE may select a different path on the basis of knowledge that some of the UAV nodes in the path {UAV4, UAV6, BS2} may no longer be available. The UE may also use round-trip times from the first packet transmission to inform its selection of a path for a subsequent transmission session. In further examples (not shown), link quality parameters for links between the nodes may be included in the paths reported to the UE, enabling the UE to select a path not only on the basis of the number of hops in the path but also on the basis of link quality over the path.

The source UE may dynamically update path discovery and selection at regular intervals, allowing the UE to continue to identify optimal paths for data transmission as mobile nodes continually change position and move in and out of proximity with each other and the source UE. Path update may be based on an update timer, such that when the timer is triggered, path update is performed in a similar manner to the initial path discovery and selection (path_request message broadcast, receipt of path messages etc.). Mobile nodes participating in a path may also update and report changes to the source UE as discussed above with reference to FIGS. 4*c*, 6*e* and 6*f*.

The methods of the present disclosure may be implemented in hardware, or as software modules running on one or more processors. The methods may also be carried out according to the instructions of a computer program, and the present disclosure also provides a computer readable medium having stored thereon a program for carrying out any of the methods described herein. A computer program embodying the disclosure may be stored on a computer readable medium, or it could, for example, be in the form of a signal such as a downloadable data signal provided from an Internet website, or it could be in any other form.

As discussed above, the methods 300, 400, 500 and 600 are performed by a UE and a mobile node respectively. The present disclosure provides a UE and a mobile node that are adapted to perform any or all of the steps of the above discussed methods.

Figure 9:
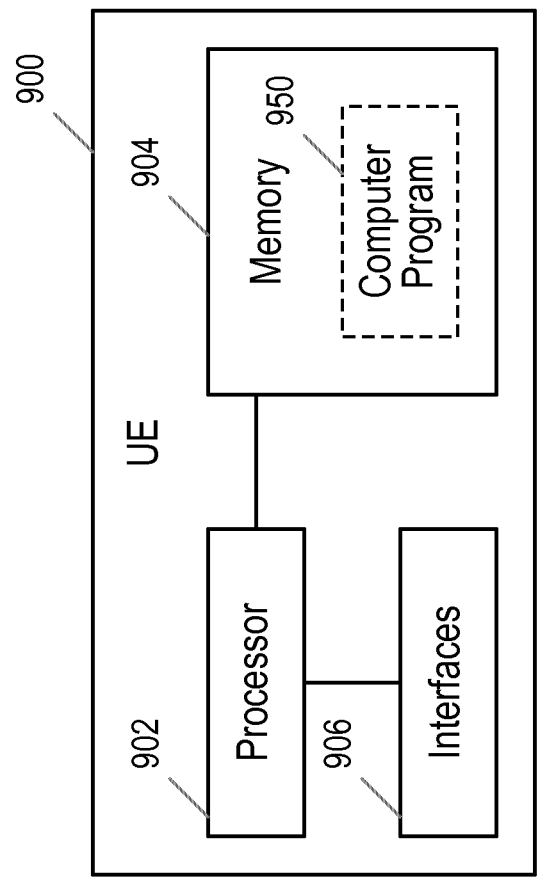
FIG. 9 is a block diagram illustrating functional modules in a UE.

FIG. 9 is a block diagram illustrating an example UE 900 which may implement the method 300 and/or 400 according to examples of the present disclosure, for example on receipt of suitable instructions from a computer program 950. Referring to FIG. 9, the UE 900 comprises a processor or processing circuitry 902, and may comprise a memory 904 and interfaces 906. The processing circuitry 902 may be operable to perform some or all of the steps of the method 300 and/or 400 as discussed above with reference to FIGS. 3 and 4*a* to 4*c*. The memory 904 may contain instructions executable by the processing circuitry 902 such that the UE 900 is operable to perform some or all of the steps of the method 300 and/or 400. The instructions may also include instructions for executing one or more telecommunications and/or data communications protocols. The instructions may be stored in the form of the computer program 950. In some examples, the processor or processing circuitry 902 may include one or more microprocessors or microcontrollers, as well as other digital hardware, which may include digital signal processors (DSPs), special-purpose digital logic, etc. The processor or processing circuitry 902 may be implemented by any type of integrated circuit, such as an Application Specific Integrated Circuit (ASIC), Field Programmable Gate Array (FPGA) etc. The memory 904 may include one or several types of memory suitable for the processor, such as read-only memory (ROM), random-access memory, cache memory, flash memory devices, optical storage devices, solid state disk, hard disk drive etc.

Figure 10:
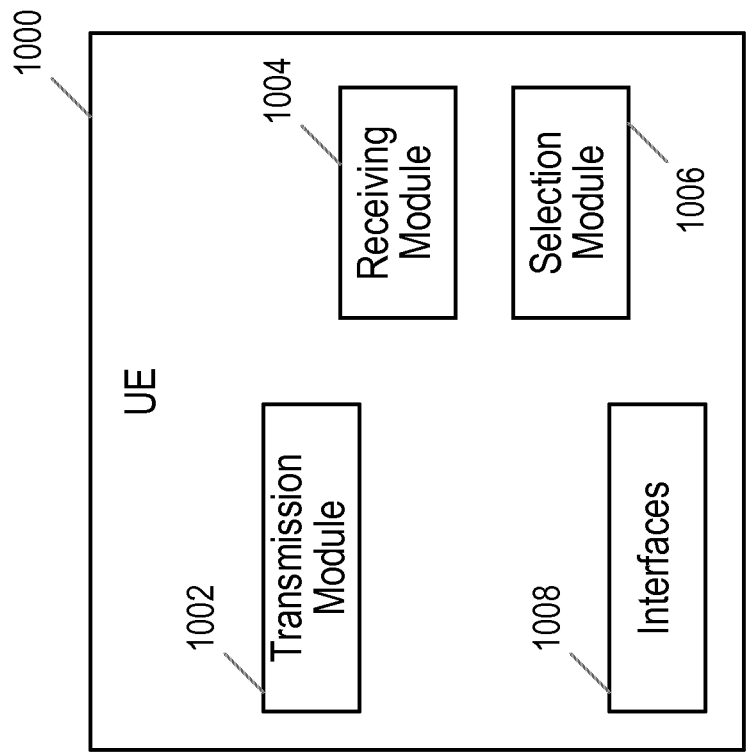
FIG. 10 is a block diagram illustrating functional modules in another example of UE.

FIG. 10 illustrates functional modules in another example of UE 1000 which may execute examples of the methods 300 and/or 400 of the present disclosure, for example according to computer readable instructions received from a computer program. It will be understood that the modules illustrated in FIG. 10 are functional modules, and may be realised in any appropriate combination of hardware and/or software. The modules may comprise one or more processors and may be integrated to any degree.

Referring to FIG. 10, the UE 1000 comprises a transmission module 1002 for transmitting a path request message requesting a path for transmission of data to the communication network, the path request message including an identifier of the UE. The UE 1000 further comprises a receiving module 1004 for receiving at least one path message including an ordered list of identifiers of mobile nodes and of a base station node of the communication network that form a path for transmission of data from the UE to the communication network. The UE further comprises a selection module 1006 for selecting a path from the received at least one path message. The transmission module 1002 is also for transmitting data to the first mobile node in the selected path. The UE 1000 may also comprise interfaces 1008.

Figure 11:
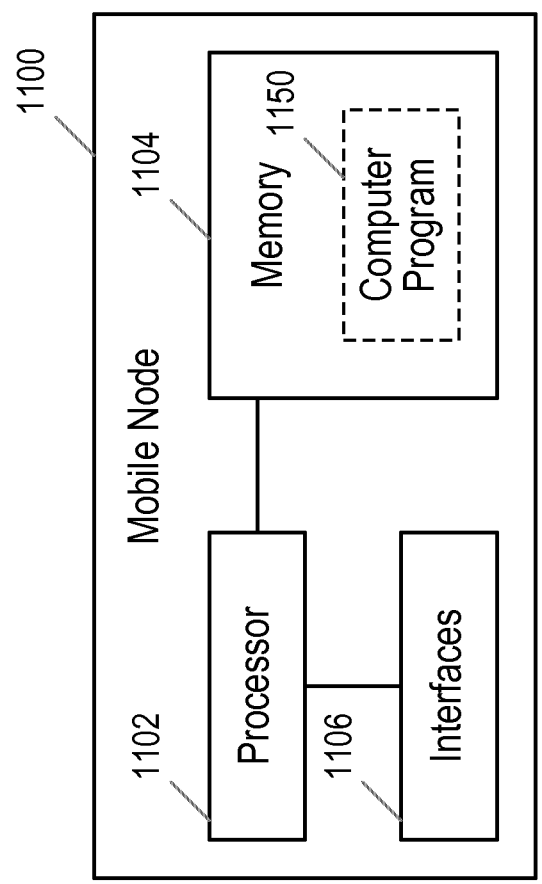
FIG. 11 is a block diagram illustrating functional modules in a mobile node.

FIG. 11 is a block diagram illustrating an example mobile node 1100 which may implement the method 500 and/or 600 according to examples of the present disclosure, for example on receipt of suitable instructions from a computer program 1150. Referring to FIG. 11, the mobile node 1100 comprises a processor or processing circuitry 1102, and may comprise a memory 1104 and interfaces 1106. The processing circuitry 1102 may be operable to perform some or all of the steps of the method 500 and/or 600 as discussed above with reference to FIGS. 5 and 6*a* to 6*f*. The memory 1104 may contain instructions executable by the processing circuitry 1102 such that the mobile node 1100 is operable to perform some or all of the steps of the method 500 and/or 600. The instructions may also include instructions for executing one or more telecommunications and/or data communications protocols. The instructions may be stored in the form of the computer program 1150. In some examples, the processor or processing circuitry 1102 may include one or more microprocessors or microcontrollers, as well as other digital hardware, which may include digital signal processors (DSPs), special-purpose digital logic, etc. The processor or processing circuitry 1102 may be implemented by any type of integrated circuit, such as an Application Specific Integrated Circuit (ASIC), Field Programmable Gate Array (FPGA) etc. The memory 1104 may include one or several types of memory suitable for the processor, such as read-only memory (ROM), random-access memory, cache memory, flash memory devices, optical storage devices, solid state disk, hard disk drive etc.

Figure 12:
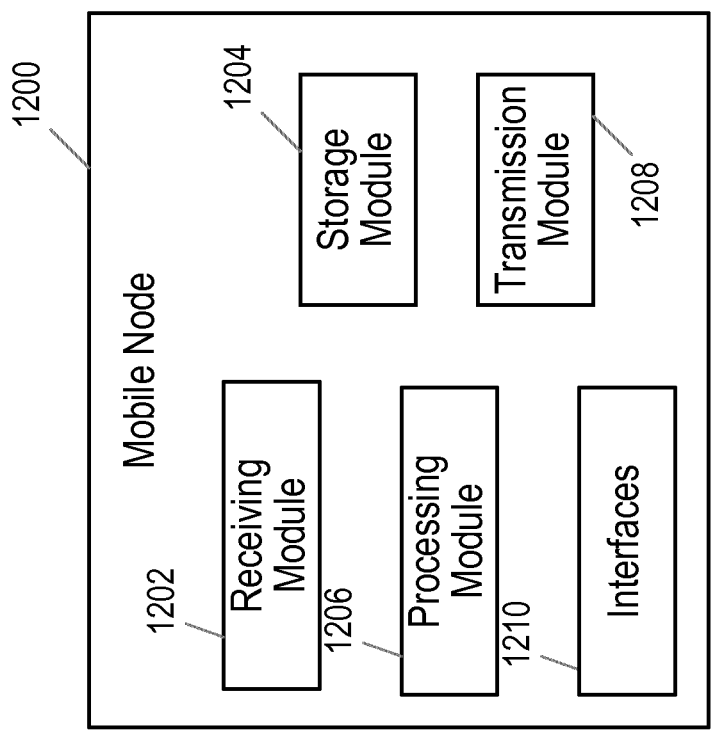
FIG. 12 is a block diagram illustrating functional modules in another example of mobile node.

FIG. 12 illustrates functional modules in another example of mobile node 1200 which may execute examples of the methods 500 and/or 600 of the present disclosure, for example according to computer readable instructions received from a computer program. It will be understood that the modules illustrated in FIG. 12 are functional modules, and may be realised in any appropriate combination of hardware and/or software. The modules may comprise one or more processors and may be integrated to any degree.

Referring to FIG. 12, the mobile node 1200 comprises a receiving module 1202 for receiving a path request message requesting a path for transmission of data to the communication network, the path request message including an identifier of the transmitter of the path request message. The mobile node further comprises a storage module 1204 for storing an identifier of the transmitter of the path request message, and a processing module 1206 for determining whether the mobile node is within a communication range of a base station node of the communication network. The mobile node further comprises a transmission module 2108 for, if the mobile node is not within a communication rage of a base station node of the communication network, forwarding the received path request message as a broadcast path request message, and including in the broadcast path request message an identifier of the mobile node. The mobile node 1200 may also comprise interfaces 1210.

Aspects of the present disclosure thus provide methods facilitating opportunistic routing of data from a UE to a communication network via one or more mobile nodes. The routing may enable data transmission in an area of no or very limited coverage from the communication network. The opportunistic routing encompasses phases including path discovery, path selection, data transmission and path update. Path discovery may be achieved through a UE sending a broadcast message to mobile nodes such as UAVs in its proximity, the message requesting connection to an e/gNB in order to discover usable paths to an e/gNB. Each mobile node that receives the broadcast message may store an identity of the previous node (requesting node) and a hop_count, and may send the request to nodes in its proximity. A node having access to an e/gNB, returns an ACK (path message) including a path list down the chain back to the source UE, so creating one possible path for a complete connection for the source UE to access an e/gNB. The path message may include link quality measurements and/or other relevant information such as node availability time. A request or an ACK (path message) down the chain may trigger moving nodes to stay in position to be prepared for upcoming data transmission. A node may be released if there is no available next hop, if a path in which the node may participate is not selected for data transmission, if a timer threshold is exceeded, etc.

Path Selection may be performed by a UE on the basis of one or more alternative paths identified in path messages received by the UE. The UE may select the first complete path, the path with least hops, the path with best link quality, or may use some combination of these and other factors to select the most appropriate path for a current transmission requirement. As soon as at least one path is selected and established, the UE may start Data Transmission. The UE may identify the path to be used for transmission of a data packet by adding to the packet the mobile node identifiers of mobile nodes forming the path, and may also include hop number(s) and destination point(s) identifiers (e/gNB ID).

Dynamic Path Update may be performed at regular intervals to account for factors including changes in node availability, link parameters etc.

It should be noted that the above-mentioned examples illustrate rather than limit the disclosure, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other module may fulfil the functions of several modules recited in the claims. Any reference signs in the claims shall not be construed so as to limit their scope.

The invention claimed is:

1. A method performed in a User Equipment, UE, that is operable to connect to a communication network, the method comprising:
   transmitting a path request message requesting a path for transmission of data to the communication network, the path request message including an identifier of the UE;
   receiving at least one path message including:
      an ordered list of identifiers of mobile nodes and of a base station node of the communication network that form a path for transmission of data from the UE to the communication network; and
      a value of a node availability time parameter indicating a time during which one of the mobile nodes in the path for transmission will remain in position to participate in the path formed by the mobile nodes and the base station node identified in the path message; and
   selecting a path from the received at least one path message; and
   transmitting data to a first mobile node in the selected path.

2. The method as claimed in claim 1, wherein the mobile nodes identified in the at least one path message comprise Unmanned Aerial Vehicles, UAVs, that are operable for communication with each other and with base station nodes of the communication network.

3. The method as claimed in claim 1, wherein transmitting a path request message requesting a path for transmission of data to the communication network comprises broadcasting the path request message.

4. The method as claimed in claim 1, further comprising:
   broadcasting a discovery message requesting identification of mobile nodes within a communication range of the UE;
   receiving at least one discovery response to the broadcast discovery message, the discovery response identifying a mobile node; and
   wherein transmitting a path request message requesting a path for transmission of data to the communication network comprises transmitting the message to at least one mobile node identified in the received discovery response message.

5. The method as claimed in claim 1, wherein transmitting data to the first mobile node in the selected path comprises adding, to a packet header of a packet of the data for transmission, the ordered list of the identifiers of the mobile nodes and base station node of the communication network that form the selected path for data transmission to the communication network.

6. The method as claimed in claim 1, further comprising:
   determining, on the basis of data to be transmitted to the communication network, target values of at least one parameter associated with the requested path for transmission of data to the communication network; and
including the determined target values in the path request message.

7. The method as claimed in claim 1, wherein the at least one path message further includes at least:
a value of a link quality parameter indicating a quality of at least one link between nodes in the path for transmission of data to the communication network.

8. The method as claimed in claim 7, wherein selecting a path from the received at least one path message comprises selecting a path on the basis of at least one of:
a number of nodes in the path;
the identifier of the base station node in the path;
quality of at least one link between nodes in the path; and
availability time of at least one node in the path.

9. The method as claimed in claim 7, further comprising:
receiving at least one updated path message, the updated path message including at least one of:
an updated value of a link quality parameter indicating a quality of at least one link between nodes in the path for transmission of data to the communication network; or
an updated identifier for a node in the path.

10. The method as claimed in claim 9, further comprising:
checking whether a value of a link quality parameter indicating a quality of a link between any of the nodes in the selected path has fallen below a threshold value;
if a value of a link quality parameter indicating a quality of a link between any of the nodes in the selected path has fallen below a threshold value, initiating selection of an alternative path; and
transmitting data to the first mobile node in the selected alternative path.

11. The method as claimed in claim 10, further comprising:
if a value of a link quality parameter indicating a quality of a link between any of the nodes in the selected path has not fallen below a threshold value, determining whether alternative paths have become available since selection of the currently selected path;
selecting a path for transmission of data to the communication network from among currently available paths; and
transmitting data to the first mobile node in the newly selected path.

12. The method as claimed in claim 9, further comprising:
if the at least one updated path message includes an updated identifier for a node in the path, checking whether the updated path message indicates an alternative path available for selection by the UE or a change to the selected path.

13. The method as claimed in claim 12, further comprising:
if the updated path message indicates a change to the selected path, determining whether a node in the selected path that has reported the change to the selected path has a path selection capability;
if the node in the selected path that has reported the change to the selected path does have a path selection capability, continuing to transmit data on the changed selected path; and
if the node in the selected path that has reported the change to the selected path does not have a path selection capability, initiating selection of an alternative path.

14. The method as claimed in claim 1, further comprising:
on transmitting the path request message requesting a path for transmission of data to the communication network, setting a UE path message timer; and
if the UE has not received at least one path message before expiry of the UE path message timer, performing at least one of:
aborting the method; or
transmitting a new path request message.

15. A method performed by a mobile node that is operable to connect to a communication network, the method comprising:
receiving a path request message requesting a path for transmission of data to the communication network, the path request message including an identifier of a transmitter of the path request message;
storing an identifier of the transmitter of the path request message;
determining whether the mobile node is within a communication range of a base station node of the communication network;
if the mobile node is not within a communication range of a base station node of the communication network, forwarding the received path request message as a broadcast path request message, and including in the broadcast path request message an identifier of the mobile node; and
if the mobile node is within a communication range of the base station node of the communication network:
adding, to a path message, a value of a node availability time parameter indicating a time during which a node will be available for participation in the path formed by mobile nodes and the base station node identified in the path message;
retrieving a stored identifier of a transmitter of a received path request message; and
forwarding the path message to the retrieved identifier.

16. The method as claimed in claim 15, further comprising:
if the mobile node is within a communication range of the base station node of the communication network, adding an identifier of the base station node of the communication network with which the mobile node can communicate, and an identifier of the mobile node, to the path message as an ordered list of identifiers of the mobile nodes and of the base station node of the communication network that form a path for transmission of data from the mobile node to the communication network.

17. The method as claimed in claim 15, wherein the mobile node comprises an Unmanned Aerial Vehicle, UAV.

18. The method as claimed in claim 15, wherein the path request message further includes a hop count parameter value, and wherein the method further comprises:
incrementing the value of the hop count parameter; and
replacing the hop count parameter value with the incremented hop count parameter value in the forwarded broadcast path request message.

19. The method as claimed in claim 18, further comprising:
checking whether the incremented value of the hop count parameter exceeds a threshold;
if the incremented value of the hop count parameter exceeds the threshold, aborting the method; and
if the incremented value of the hop count parameter does not exceed the threshold, proceeding with the method.

20. The method as claimed in claim 15, wherein the received path request message is a broadcast message, and wherein the method further comprises:
- sending an acknowledgement of path request message to the transmitter of the broadcast message, the acknowledgement of path request message including an identifier of the mobile node.

21. The method as claimed in claim 20, further comprising:
- on receipt of the path request message, comparing the identifier of the transmitter of the path request message with an identifier of any previously received acknowledgement of broadcast path request messages; and
- if the identifier of the transmitter of the path request message is the same as an identifier of any previously received acknowledgement of broadcast path request messages, discarding the received broadcast message.

22. The method as claimed in claim 15, wherein the path request message further comprises target values of at least one parameter associated with the requested path for transmission of data to the communication network; and wherein the method further comprises;
- checking whether at least one of the mobile node or a link between the mobile node and at least the transmitter of the received path request message can meet the target values;
- if at least one of the mobile node or link cannot meet the target values, discarding the path request message; and
- if the mobile node and link can meet the target values, proceeding with the method.

23. The method as claimed in claim 15, further comprising:
- receiving a path message including an ordered list of identifiers of mobile nodes and of a base station node of the communication network that form a path for transmission of data from the mobile node to the communication network;
- adding an identifier of the mobile node to the ordered list included in the received path message;
- retrieving a stored identifier of a transmitter of a received path request message; and
- forwarding the path message to the transmitter, identified by the retrieved identifier.

24. The method as claimed in claim 23, further comprising:
- on forwarding the path request message as a broadcast message, starting a mobile node path message timer, and maintaining a current position of the mobile node; and
- if at least one path message has not been received before expiry of the mobile node path message timer, ceasing to maintain the current position of the mobile node.

25. The method as claimed in claim 24, further comprising, if at least one path message has not been received before expiry of the mobile node path message timer, discarding the stored identity of the transmitter of the path request message.

26. The method as claimed in claim 16, further comprising:
- including in the forwarded path message at least:
  - a value of a link quality parameter indicating a quality of a link between the mobile node and at least one of the transmitter of the received path message or the transmitter of the received path request message.

27. The method as claimed in claim 16, further comprising:
- receiving data for transmission, wherein the data includes an ordered list of identifiers of mobile nodes and a base station node of the communication network that form a path for data transmission to the communication network; and
- forwarding the data to the node in the ordered list whose identifier appears after the identifier of the mobile node.

28. The method as claimed in claim 16, further comprising:
- on forwarding the path message to the transmitter identified by the retrieved identifier, starting a mobile node transmission timer and maintaining a current position of the mobile node; and
- if data for transmission has not been received before expiry of the mobile node transmission timer, ceasing to maintain the current position of the mobile node.

29. The method as claimed in claim 28, further comprising:
- if data for transmission has not been received before expiry of the mobile node transmission timer, discarding the stored identity of the transmitter of the path request message.

30. The method as claimed in claim 29, further comprising:
- responsive to a path update trigger, checking for the presence of mobile nodes, in addition to a node to which the data was forwarded, within a communication range of the mobile node; and
- if additional mobile nodes are not present, retrieving a stored identifier of a transmitter of a received path request message; and
- sending an updated path message to the retrieved identifier, wherein the updated path message includes an updated value of at least one of:
  - a link quality parameter indicating a quality of a link between the mobile node and at least one of the transmitter of the received path message or the transmitter of the received path request message.

31. The method as claimed in claim 30, further comprising:
- if additional mobile nodes are present, re-forwarding the received path request message as a broadcast path request message, including in the broadcast path request message an identifier of the mobile node;
- receiving an updated path message including a new ordered list of identifiers of mobile nodes and of a base station node of the communication network that form a path for transmission of data from the mobile node to the communication network;
- if the mobile node does not have a path selection capability, adding an identifier of the mobile node to the ordered list included in the received updated path message;
- retrieving a stored identifier of a transmitter of a received path request message; and
- forwarding the updated path message to the retrieved identifier.

32. The method as claimed in claim 31, further comprising:
- if the mobile node has a path selection capability, setting a parameter in the updated path message to state that the updated path message indicates a change to a selected path;
- adding an identifier of the mobile node to the ordered list included in the received updated path message;
- retrieving a stored identifier of a transmitter of a received path request message; and
- forwarding the updated path message to the retrieved identifier.

33. The method as claimed in claim 32, further comprising:
setting a parameter in the updated path message to indicate that the mobile node has a path selection capability.

34. The method as claimed in claim 30, wherein the path update trigger comprises at least one of:
a time based trigger; or
a threshold based trigger indicating that a value of a link quality parameter indicating a quality of a link between the mobile node and another node in the path has fallen below a threshold value.

35. A computer program storage medium comprising non-transitory computer readable media having stored thereon a computer program comprising instructions which, when executed on at least one processor, cause the at least one processor to carry out a method, the method comprising:
transmitting a path request message requesting a path for transmission of data to a communication network, the path request message including an identifier of a user equipment (UE);
receiving at least one path message including:
an ordered list of identifiers of mobile nodes and of a base station node of the communication network that form a path for transmission of data from the UE to the communication network; and
a value of a node availability time parameter indicating a time during which one of the mobile nodes in the path for transmission will remain in position to participate in the path formed by the mobile nodes and base station node identified in the path message; and
selecting a path from the received at least one path message; and
transmitting data to a first mobile node in the selected path.

36. A User Equipment, UE, that is operable to connect to a communication network, the UE comprising processing circuitry configured to cause the UE to:
transmit a path request message requesting a path for transmission of data to the communication network, the path request message including an identifier of the UE;
receive at least one path message including:
an ordered list of identifiers of mobile nodes and of a base station node of the communication network that form a path for transmission of data from the UE to the communication network; and
a value of a node availability time parameter indicating a time during which one of the mobile nodes in the path for transmission will remain in position to participate in the path formed by the mobile nodes and base station node identified in the path message; and
select a path from the received at least one path message; and
transmit data to a first mobile node in the selected path.

37. The UE as claimed in claim 36, wherein the mobile nodes identified in the at least one path message comprise Unmanned Aerial Vehicles, UAVs, that are operable for communication with each other and with base station nodes of the communication network.

* * * * *